(12) United States Patent
Lee et al.

(10) Patent No.: US 11,675,231 B2
(45) Date of Patent: Jun. 13, 2023

(54) COMPOSITION FOR LIGHT CONVERSION LAYER, LIGHT CONVERSION LAYER AND ELECTRONIC DEVICE INCLUDING THE SAME

(71) Applicants: Samsung Display Co., Ltd., Yongin-si (KR); DONGWOO FINE-CHEM CO., LTD., Iksan-si (KR)

(72) Inventors: Baek Hee Lee, Seoul (KR); Donghee Lee, Hwaseong-si (KR); Sun-Young Hong, Suwon-si (KR); Juho Kim, Pyeongtaek-si (KR); Hyungjoo Kim, Pyeongtaek-si (KR); Jongsoo Lee, Suwon-si (KR)

(73) Assignees: SAMSUNG DISPLAY CO., LTD., Yongin-si (KR); DONGWOO FINE-CHEM CO., LTD., Iksan-si (KR)

( * ) Notice: Subject to any disclaimer, the term of this patent is extended or adjusted under 35 U.S.C. 154(b) by 0 days.

(21) Appl. No.: 16/688,882

(22) Filed: Nov. 19, 2019

(65) Prior Publication Data

US 2020/0201124 A1    Jun. 25, 2020

(51) Int. Cl.
  *G02F 1/1335* (2006.01)
  *C08L 33/08* (2006.01)
  *C08K 5/37* (2006.01)
  *C08K 5/372* (2006.01)
  *G02F 1/13357* (2006.01)
  *B82Y 20/00* (2011.01)

(52) U.S. Cl.
  CPC ........ *G02F 1/133621* (2013.01); *C08K 5/372* (2013.01); *C08L 33/08* (2013.01); *B82Y 20/00* (2013.01); *G02F 1/133614* (2021.01); *G02F 2202/023* (2013.01); *G02F 2202/36* (2013.01)

(58) Field of Classification Search
  CPC .......... C08K 3/08; C08K 5/372; C08L 33/08; C09K 11/02; B82Y 20/00; G02F 1/133621; G02F 2001/133614; G02F 2202/023; G02F 2202/36; G03F 7/0007; G03F 7/0048; G03F 7/0275; G03F 7/031; G03F 7/033; G03F 7/2053
  See application file for complete search history.

(56) References Cited

U.S. PATENT DOCUMENTS

| 9,366,398 B2 | 6/2016 | Jang et al. |
| 9,933,132 B2 | 4/2018 | Shin et al. |
| 10,215,907 B2 | 2/2019 | Oh et al. |
| 10,329,409 B2 | 6/2019 | Lee et al. |

(Continued)

FOREIGN PATENT DOCUMENTS

| CN | 106574178 | 4/2017 |
| CN | 107102513 | 8/2017 |

(Continued)

OTHER PUBLICATIONS

Extended European Search Report dated Feb. 13, 2020, issued in European Patent Application No. 19217180.9.

*Primary Examiner* — Bijan Ahvazi
(74) *Attorney, Agent, or Firm* — Kile Park Reed & Houtteman PLLC

(57) ABSTRACT

A composition for a light conversion layer includes: a base resin; quantum dots; and a thiol compound including at least one thiol group in a molecule.

11 Claims, 4 Drawing Sheets

(56) References Cited

U.S. PATENT DOCUMENTS

| | | | |
|---|---|---|---|
| 10,559,726 B2 | 2/2020 | Kang et al. | |
| 2006/0275676 A1 * | 12/2006 | Yamada | C08J 3/20 430/7 |
| 2012/0001217 A1 | 1/2012 | Kang et al. | |
| 2012/0113671 A1 * | 5/2012 | Sadasivan | C09D 11/101 362/602 |
| 2017/0152437 A1 | 6/2017 | Torres Cano et al. | |
| 2017/0186922 A1 | 6/2017 | Kim et al. | |
| 2017/0205664 A1 * | 7/2017 | Cho | G02F 1/133606 |
| 2017/0315283 A1 | 11/2017 | Lee et al. | |
| 2017/0369778 A1 * | 12/2017 | Chou | C09K 11/02 |
| 2018/0044582 A1 | 2/2018 | Qiu et al. | |
| 2018/0057658 A1 | 3/2018 | Qiu et al. | |
| 2018/0299775 A1 * | 10/2018 | Kwon | G03F 7/0007 |
| 2019/0293839 A1 | 9/2019 | Lee et al. | |

FOREIGN PATENT DOCUMENTS

| | | | |
|---|---|---|---|
| CN | 107433746 | 12/2017 | |
| CN | 107532079 | 1/2018 | |
| JP | 2011253174 A * | 12/2011 | G02B 5/20 |
| KR | 10-2014-0094806 | 7/2014 | |
| KR | 10-2016-0038325 | 4/2016 | |
| KR | 10-2016-0081739 | 7/2016 | |
| KR | 10-2016-0121743 | 10/2016 | |
| KR | 10-1690624 | 12/2016 | |
| KR | 10-2017-0124678 | 11/2017 | |
| KR | 10-1855991 | 5/2018 | |
| KR | 10-1859637 | 5/2018 | |
| WO | WO-2016167927 A1 * | 10/2016 | B32B 7/12 |
| WO | 2018092705 | 5/2018 | |

\* cited by examiner

COMPOSITION FOR LIGHT CONVERSION LAYER, LIGHT CONVERSION LAYER AND ELECTRONIC DEVICE INCLUDING THE SAME

CROSS REFERENCE TO RELATED APPLICATION

This application claims priority from and the benefit of Korean Patent Application No. 10-2018-0164817, filed on Dec. 19, 2018, which is hereby incorporated by reference for all purposes as if fully set forth herein.

BACKGROUND

Field

Exemplary implementations of the invention relate generally to a composition for a light conversion layer, a light conversion layer formed using the composition for a light conversion layer, and an electronic device including the same.

Discussion of the Background

Various electronic devices have been developed for providing image information from multimedia devices such as a television, a cellular phone, a tablet computer, a navigation and a game console. Particularly, in electronic devices including a liquid crystal display device and an organic electroluminescence device introduce quantum dots in order to improve display quality.

In addition, in order that such electronic devices show good display quality and improved reliability properties, a method for improving reliability on optical functional layers including quantum dots is being studied.

The above information disclosed in this Background section is only for understanding of the background of the inventive concepts, and, therefore, it may contain information that does not constitute prior art.

SUMMARY

Devices constructed according to exemplary embodiments of the invention provide a composition for a light conversion layer including quantum dots and having improved reliability, and a light conversion layer having improved reliability and an electronic device including the same.

Additional features of the inventive concepts will be set forth in the description which follows, and in part will be apparent from the description, or may be learned by practice of the inventive concepts.

According to one or more exemplary embodiments of the invention, a composition for a light conversion layer includes: a base resin; a quantum dot; and a thiol compound including at least one thiol group in a molecule.

The thiol compound may include one to six thiol groups.

The thiol compound may be comprised in 10 wt % to 40 wt % based on a total weight of the composition for a light conversion layer.

The thiol compound may be represented by the following Formula 1:

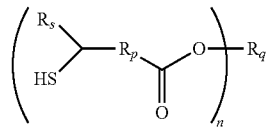

[Formula 1]

Here, $R_s$ may be a hydrogen atom, a deuterium atom, or a substituted or unsubstituted alkyl group of 1 to 12 carbon atoms, $R_p$ may be a substituted or unsubstituted alkylene group of 1 to 12 carbon atoms, $R_q$ may be a substituted or unsubstituted alkyl group of 1 to 12 carbon atoms, a substituted or unsubstituted alkoxy group of 1 to 12 carbon atoms, or a substituted or unsubstituted heterocyclic group of 2 to 6 carbon atoms for forming a ring, and n may be an integer of 1 to 6.

The thiol compound may include at least one of the following compounds TC-1, TC-2, TC-3, TC-4, TC-5, and TC-6:

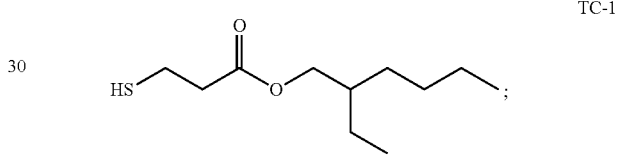

TC-1

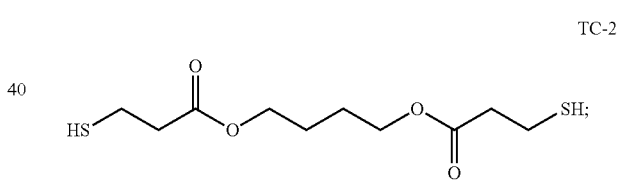

TC-2

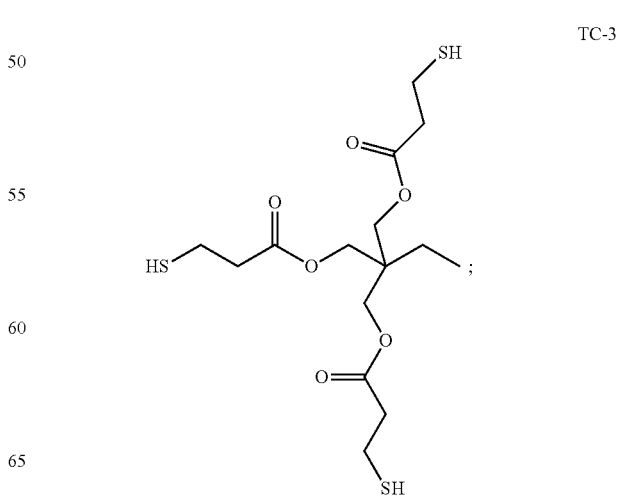

TC-3

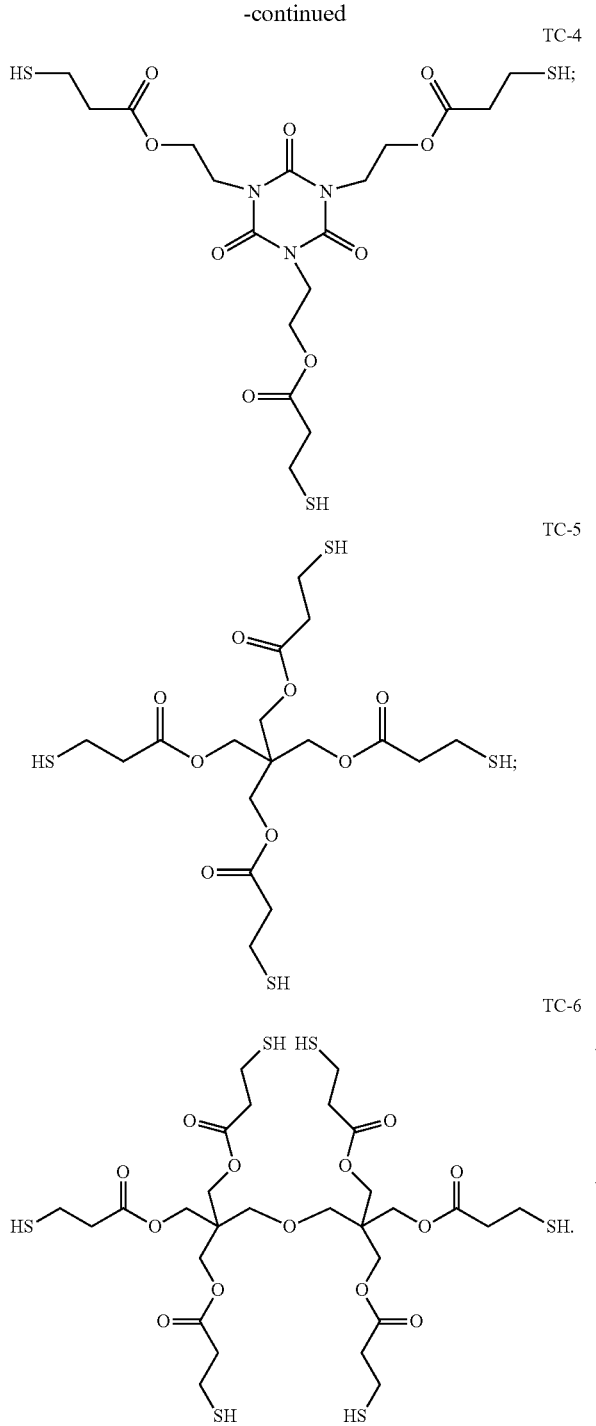

The base resin may be an acrylic resin.

The composition of the a light conversion layer may include, based on a total weight of the composition for a light conversion layer: 20 wt % to 89 wt % of the base resin; 1 wt % to 60 wt % of the quantum dot; and 10 wt % to 40 wt % of the thiol compound.

A thermal curing agent including at least one of a polyfunctional alicyclic epoxy resin, a novolak epoxy resin and a silane epoxy resin may be further included.

The thermal curing agent may be represented by at least one of the following Formula 2 and Formula 3:

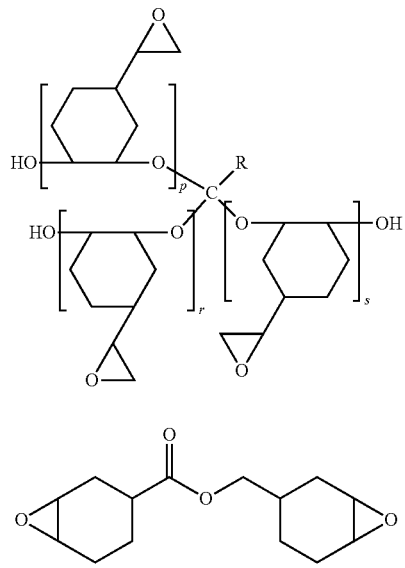

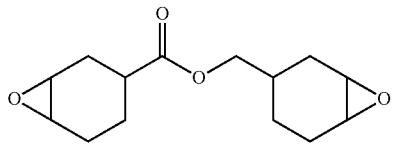

Here, R may be a substituted or unsubstituted alkyl group of 1 to 10 carbon atoms, and p, r, and s may be each independently an integer of 1 to 20.

The composition for the light conversion layer may further includes at least one solvent having a boiling point of about 100° C. to about 180° C.

The at least one solvent may be included in 50 wt % to 90 wt % based on a total weight of the composition for a light conversion layer, and the composition for the light conversion layer may include, based on 100 wt % of a total solid content of the composition for a light conversion layer which comprises the base resin, the quantum dot, and the thiol compound: 20 wt % to 89 wt % of the base resin; 1 wt % to 60 wt % of the quantum dots; and 10 wt % to 40 wt % of the thiol compound.

Scattering particles may be further included.

According to one or more exemplary embodiments of the invention, a light conversion layer includes a matrix part; quantum dots dispersed in the matrix part; and a thiol compound including at least one thiol group in a molecule.

the thiol compound may include at least one of the following compounds TC-1, TC-2, TC-3, TC-4, TC-5, and TC-6:

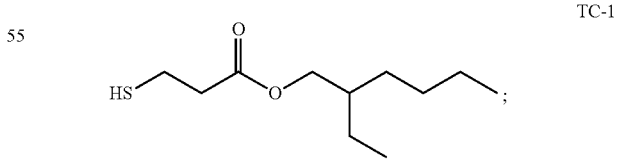

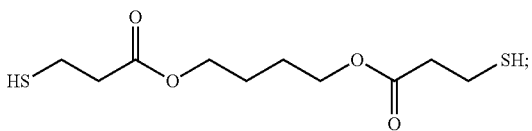

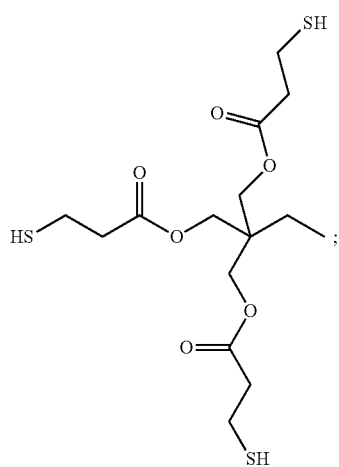

TC-3

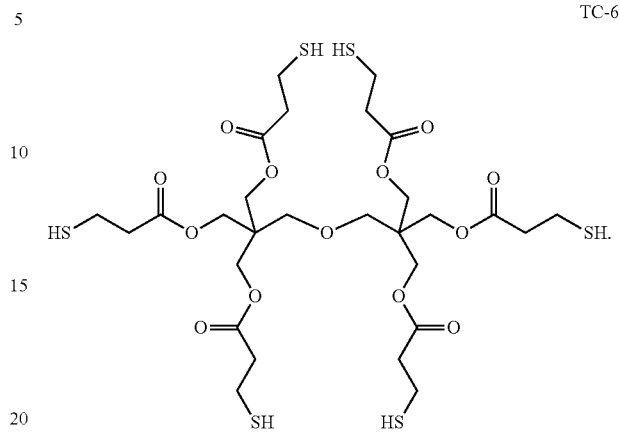

TC-6

The thiol compound may be included in 10 wt % to 40 wt % based on a total weight of the light conversion layer.

According to one or more exemplary embodiments of the invention, an electronic device includes a light source part providing first color light, and a light conversion layer disposed on the light source part, wherein the light conversion layer includes a matrix part; at least one quantum dot configured to convert a wavelength of the first color light; and a thiol compound including at least one thiol group in a molecule.

The thiol compound may include one to six thiol groups.

The thiol compound may be included in 10 wt % to 40 wt % based on a total weight of the light conversion layer.

The thiol compound may include at least one among the following compounds TC-1, TC-2, TC-3, TC-4, TC-5, and TC-6:

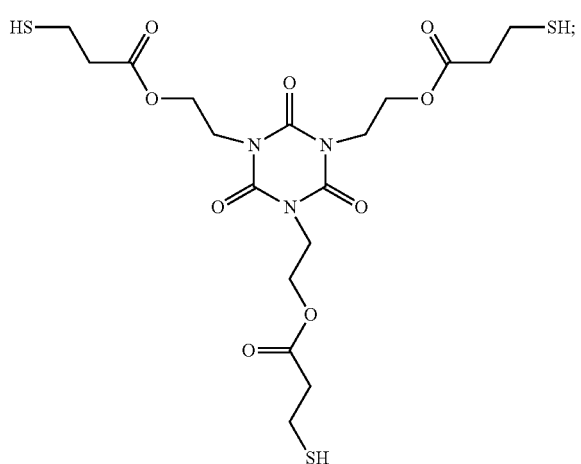

TC-4

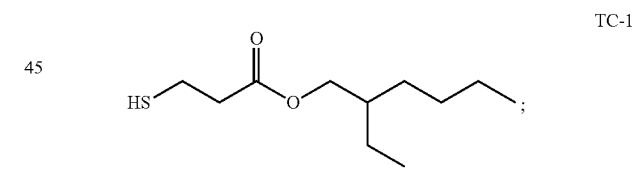

TC-1

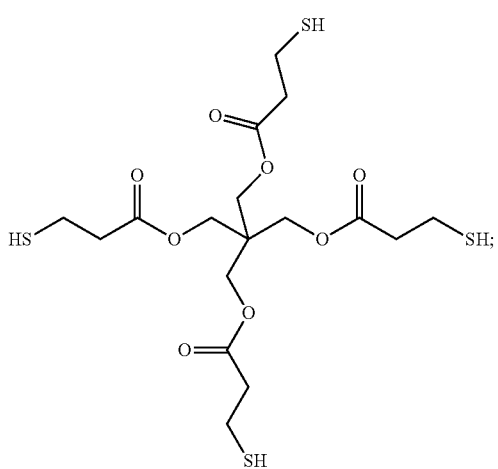

TC-5

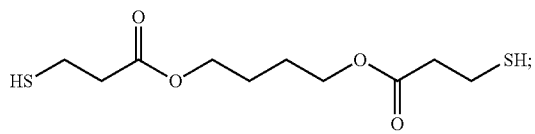

TC-2

-continued

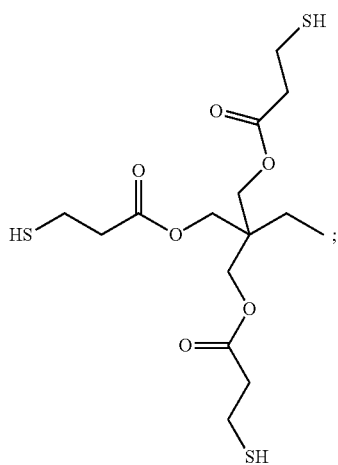
TC-3

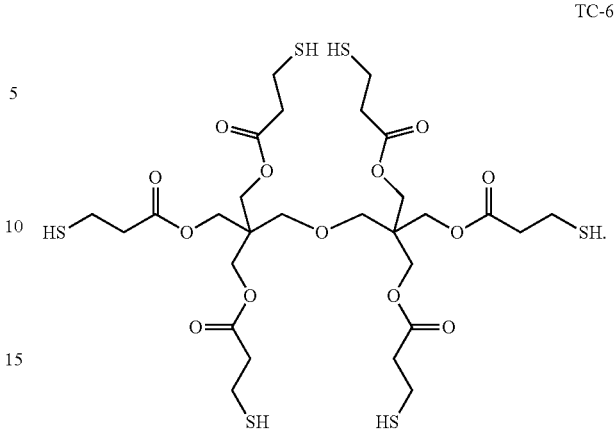
TC-6

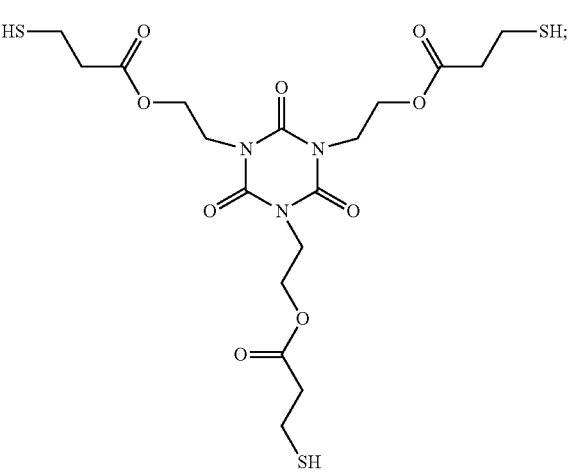
TC-4

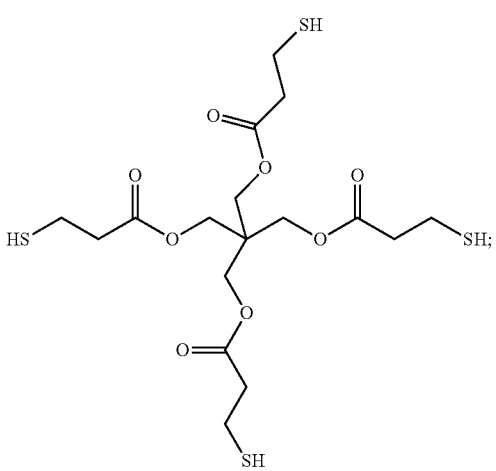
TC-5

The first color light may be blue light, and the at least one quantum dot may include a first quantum dot may be configured to convert the first color light into green light; and a second quantum dot may be configured to convert the first color light into red light.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1:
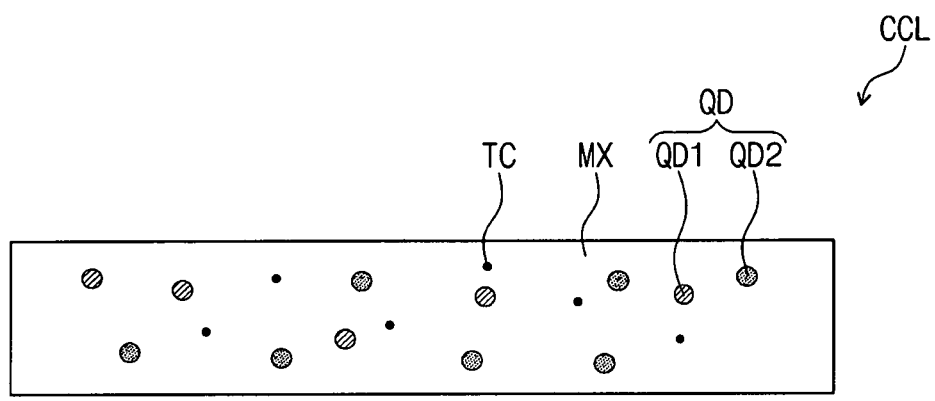
FIG. 1 is a cross-sectional view of a light conversion layer of an exemplary embodiment.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the DR1-axis, the DR2-axis, and the DR3-axis are not limited to three axes of a rectangular coordinate system, such as the x, y, and z-axes, and may be interpreted in a broader sense. For example, the DR1-axis, the DR2-axis, and the DR3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

The composition for a light conversion layer of an exemplary embodiment may include a base resin, quantum dots, and a thiol compound having at least one thiol group in a molecule.

The base resin may be an acrylic resin. The acrylic resin may be a copolymer including a carboxyl group-containing monomer, and another monomer which is copolymerized therewith.

For example, the carboxylic acid-containing monomer may be a polyfunctional unsaturated carboxylic acid having one or more carboxyl groups in a molecule such as an unsaturated monocarboxylic acid, an unsaturated dicarboxylic acid, and an unsaturated tricarboxylic acid.

Meanwhile, the unsaturated monocarboxylic acid may be, for example, acrylic acid, methacrylic acid, crotonic acid, α-chloroacrylic acid, and cinnamic acid. The unsaturated dicarboxylic acid may be, for example, maleic acid, fumaric acid, itaconic acid, citraconic acid, and mesaconic acid. The unsaturated polyfunctional carboxylic acid may be an acid anhydride, particularly, maleic anhydride, itaconic anhydride, citraconic anhydride, etc.

In addition, the unsaturated polyfunctional carboxylic acid may be mono(2-methacryloyloxyalkyl)ester, for example, mono(2-acryloyloxyethyl) succinate, mono(2-methacryloyloxyethyl) succinate, mono(2-acryloyloxyethyl) phthalate, mono(2-methacryloyloxyethyl) phthalate, etc. The unsaturated polyfunctional carboxylic acid may be mono(meth)acrylate of a polymer with dicarboxyl at both terminals, for example, ω-carboxypolycaprolacton monoacrylate, ω-carboxypolycaprolacton monomethacrylate, etc.

Such carboxyl group-containing monomer may be used alone or as a mixture of two or more thereof.

Another monomer capable of copolymerizing with the carboxyl group-containing monomer may be aromatic vinyl compounds, carboxylic acid ester compounds, unsaturated carboxylic acid amino alkyl ester compounds, glycidyl ester compounds, vinyl ester compounds, unsaturated ester compounds, vinyl cyanide compounds, unsaturated amide compounds, unsaturated imide compounds, aliphatic conjugated dienes, and other macromonomers.

For example, the aromatic vinyl compound may be styrene, α-methylstyrene, o-vinyltoluene, m-vinyltoluene, p-vinyltoluene, p-chlorostyrene, o-methoxystyrene, m-methoxystyrene, p-methoxystyrene, o-vinylbenzyl methyl ether, m-vinylbenzyl methyl ether, p-vinylbenzyl methyl ether, o-vinylbenzyl glycidyl ether, m-vinylbenzyl glycidyl ether, p-vinylbenzyl glycidyl ether, indene, etc.

In addition, the carboxylic acid ester compound may be methyl acrylate, methyl methacrylate, ethyl acrylate, ethyl methacrylate, n-propyl acrylate, n-propyl methacrylate, propyl acrylate, i-propyl methacrylate, n-butyl acrylate, n-butyl methacrylate, i-butyl acrylate, butyl methacrylate, sec-butyl acrylate, sec-butyl methacrylate, t-butyl acrylate, t-butyl methacrylate, 2-hydroxyethyl acrylate, 2-hydroxyethyl methacrylate, 2-hydroxypropyl acrylate, 2-hydroxypropyl methacrylate, 3-hydroxypropyl acrylate, 3-hydroxypropyl methacrylate, 2-hydroxybutyl acrylate, 2-hydroxybutyl methacrylate, 3-hydroxybutyl acrylate, 3-hydroxybutyl methacrylate, 4-hydroxybutyl acrylate, 4-hydroxybutyl methacrylate, allyl acrylate, allyl methacrylate, benzyl acrylate, benzyl methacrylate, cyclohexyl acrylate, cyclohexyl methacrylate, phenyl acrylate, phenyl methacrylate, 2-methoxyethyl acrylate, 2-methoxyethyl methacrylate, 2-phenoxyethyl acrylate, 2-phenoxyethyl methacrylate, methoxy diethylene glycol acrylate, methoxy diethylene glycol methacrylate, methoxy triethylene glycol acrylate, methoxy triethylene glycol methacrylate, methoxy propylene glycol acrylate, methoxy propylene glycol methacrylate, methoxy dipropylene glycol acrylate, methoxy dipropylene glycol methacrylate, isobornyl acrylate, isobornyl methacrylate, dicyclopentadienyl acrylate, dicyclopentadiethyl methacrylate, adamantly (meth)acrylate, norbornyl (meth)acrylate, 2-hydroxy-3-phenoxypropyl acrylate, 2-hydroxy-3-phenoxypropyl methacrylate, glycerol monoacrylate, glycerol monomethacrylate, etc.

For example, the unsaturated carboxylic acid amino alkyl ester compound may be 2-aminoethyl acrylate, 2-aminoethyl methacrylate, 2-dimethylaminoethyl acrylate, 2-dimethylaminoethyl methacrylate, 2-aminopropyl acrylate, 2-aminopropyl methacrylate, 2-5 dimethylaminopropyl acrylate, 2-dimethylaminopropyl methacrylate, 3-aminopropyl acrylate, 3-aminopropyl methacrylate, 3-dimethylaminopropyl acrylate, 3-dimethylaminopropyl methacrylate, etc.

The glycidyl ester compound may be glycidyl acrylate, glycidyl methacrylate, etc. In addition, the vinyl ester compound may be vinyl acetate, vinyl propionate, vinyl butyrate, vinyl benzoate, etc.

For example, the unsaturated ether compound may be vinyl methyl ether, vinyl ethyl ether, allyl glycidyl ether, etc. In addition, the vinyl cyanide compound may be acrylonitrile, methacrylonitrile, a-chloroacrylonitrile, vinylidene cyanide, etc.

The unsaturated amide compound may be acrylamide, methacrylamide, a-chloroacrylamide, N-2-hydroxyethylacrylamide, N-2-hydroxyethylmethacrylamide, etc.

The unsaturated imide compound may be, for example, maleimide, benzylmaleimide, N-phenylmaleimide, N-cyclohexylmaleimide, etc. In addition, the aliphatic conjugated diene compound may be 1,3-butadiene, isoprene, chloroprene, etc.

Meanwhile, the macromonomer compound may be, for example, polystyrene, polymethyl acrylate, polymethylmethacrylate, poly-n-butyl acrylate, poly-n-butyl methacrylate, or polysiloxane having a monoacryloyl group or monomethacryloyl group at one terminal of a polymer molecule chain.

The monomers may be used alone or as a mixture of two or more. Particularly, as another monomer capable of copolymerizing the carboxyl group-containing monomer, a monomer having a norbornyl skeleton, a monomer having an adamantane skeleton, a monomer having a rosin skeleton, etc. may be used. Such a monomer having a norbornyl skeleton, a monomer having an adamantane skeleton, a monomer having a rosin skeleton, etc. may have bulky steric properties and may reduce the specific dielectric constant of an acrylic resin which is a polymer.

A weight average molecular weight of the acrylic resin may be about 2,000 g/mol to about 200,000 g/mol. Meanwhile, the weight average molecular weight corresponds to a polystyrene conversion weight average molecular weight measured by gel permeation chromatography (GPC, using a THF solvent).

For example, the weight average molecular weight of the acrylic resin may be about 3,000 g/mol to about 100,000 g/mol. Meanwhile, by providing the weight average molecular weight of the acrylic resin of about 2,000 g/mol to about 200,000 g/mol, the coating hardness of a light conversion layer formed using the composition for a light conversion layer of an exemplary embodiment may be improved. In addition, by including the acrylic resin having the weight average molecular weight of about 2,000 g/mol to about 200,000 g/mol in the composition for a light conversion layer, the deterioration of light-emitting properties due to the exposure of quantum dots included in the composition for a light conversion layer to an external environment may be prevented or suppressed.

The composition for a light conversion layer of an exemplary embodiment may include the base resin in about 20 wt % to about 89 wt % based on a total weight of the composition for a light conversion layer. For example, in the composition for a light conversion layer, the acrylic resin may be included in about 20 wt % to about 89 wt % based on a total weight of the composition for a light conversion layer.

Meanwhile, the weight ratio of the base resin, the quantum dot, and the thiol compound in the composition for a light conversion layer in the present description may be based on the solid content in the composition for a light conversion layer. In the present description, the solid content of the composition for a light conversion layer may include all constituent components excluding a solvent, which will be explained later.

By including the base resin in about 20 wt % to about 89 wt % based on 100 wt % of the total composition for a light conversion layer, the formation of a light conversion layer using the composition for a light conversion layer may become easy, and the protecting properties of the quantum dots included in the light conversion layer may be excellent. For example, in case where the amount of the base resin is less than about 20 wt % with respect to the total composition for a light conversion layer, the coating properties of the composition for a light conversion layer may be degraded and the mechanical properties of the light conversion layer may be deteriorated, and in case where the amount of the base resin is greater than about 89 wt % with respect to the total composition for a light conversion layer, the content of the base resin in the composition for a light conversion layer may increase and the light-emitting properties of the quantum dots may be insufficiently secured.

The composition for a light conversion layer of an exemplary embodiment includes quantum dots. The quantum dot may be a particle converting the wavelength of light provided. The quantum dot is a material having a crystalline structure with a size of several nanometers, is composed of hundreds to thousands of atoms, and shows quantum confinement effect by which energy band gap is increased due to its small size. In case where light with a wavelength having higher energy than the band gap is incident to the quantum dot, the quantum dot absorbs this light and is excited, and then, returns to a ground state while emitting light with a specific wavelength. The light with the emitted wavelength has a value corresponding to the band gap. The quantum dot may control light-emitting properties due to quantum confinement effect by controlling the size and composition thereof. The quantum dot may be selected from compounds of II-VI groups, compounds of III-V groups, compounds of IV-VI groups, compounds of IV group, compounds of IV group and a combination thereof.

The compounds of II-VI groups may be selected from the group consisting of binary compounds selected from the group consisting of CdSe, CdTe, ZnS, ZnSe, ZnTe, ZnO, HgS, HgSe, HgTe, MgSe, MgS and a mixture thereof, ternary compounds selected from the group consisting of CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, MgZnS and a mixture thereof, and quaternary compounds selected from the group consisting of HgZnTeS, CdZnSeS, CdZnSeTe, CdZnSTe, CdHgSeS, CdHgSeTe, CdHgSTe, HgZnSeS, HgZnSeTe, HgZnSTe and a mixture thereof.

The compounds of III-V groups may be selected from the group consisting of binary compounds selected from the group consisting of GaN, GaP, GaAs, GaSb, AlN, AlP, AlAs, AlSb, InN, InP, InAs, InSb and a mixture thereof, ternary compounds selected from the group consisting of GaNP, GaNAs, GaNSb, GaPAs, GaPSb, AlNP, AlNAs, AlNSb, AlPAs, AlPSb, InNP, InNAs, InNSb, InPAs, InPSb, GaAlNP and a mixture thereof, and quaternary compounds selected from the group consisting of GaAlNAs, GaAlNSb, GaAlPAs, GaAlPSb, GaInNP, GaInNAs, GaInNSb, GaInNAs, GaInPSb, InAlNP, InAlNAs, InAlNSb, InAlPAs, InAlPSb and a mixture thereof.

The compounds of TV-VI groups may be selected from the group consisting of binary compounds selected from the group consisting of SnS, SnSe, SnTe, PbS, PbSe, PbTe and a mixture thereof, ternary compounds selected from the group consisting of SnSeS, SnSeTe, SnSTe, PbSeS, PbSeTe, PbSTe, SnPbS, SnPbSe, SnPbTe and a mixture thereof, and quaternary compounds selected from the group consisting of SnPbSSe, SnPbSeTe, SnPbSTe and a mixture thereof. The elements of IV group may be selected from the group consisting of Si, Ge and a mixture thereof. The compounds of IV group may be a binary compound selected from the group consisting of SiC, SiGe and a mixture thereof.

In this case, the binary compound, the ternary compound or the quaternary compound may be present at uniform concentration in a particle, or may be present at partially different concentration distribution states in the same particle.

The quantum dot may have a homogeneous single structure, a double structure such as a core-shell structure and a gradient structure, or a mixture structure thereof. For example, if the quantum dot has the core-shell structure, materials forming a core and a shell may be formed using different semiconductor compounds among the above-mentioned semiconductor compounds. For example, the core may use one or more materials selected from CdSe, CdS, ZnS, ZnSe, CdTe, CdSeTe, CdZnS, PbSe, AgInZnS, and ZnO, but an exemplary embodiment is not limited thereto. In addition, the shell may include one or more materials selected from CdSe, ZnSe, ZnS, ZnTe, CdTe, PbS, TiO, SrSe, and HgSe, but an exemplary embodiment is not limited thereto.

The quantum dot may be synthesized by a wet chemical process, a metal organic chemical vapor deposition (MOCVD) process, a molecular beam epitaxy (MBE) process, etc. However, the method of synthesizing the quantum dot is not limited thereto.

The quantum dot may be a particle having a nanometer scale. The quantum dot may improve color purity or color reproducibility. In addition, light emitted through such quantum dot is omnidirectional, and if the quantum dot is used in a display panel, etc., the wide viewing angle characteristics of the display panel may be improved.

In addition, the shape of the quantum dot may be a commonly used shape and is not specifically limited. However, more particularly, a nanoparticle, nanotube, nanowire, nanofiber, or nanoplate particle of a spherical shape, a pyramid shape, a multi-arm shape, or a cubic shape may be used.

The composition for a light conversion layer of an exemplary embodiment may include the quantum dots in about 1 wt % to about 60 wt % based on total 100 wt % of the composition for a light conversion layer. That is, the quantum dot may be included in about 1 wt % to about 60 wt % among the solid content of the composition for a light conversion layer of an exemplary embodiment. For example, the quantum dot may be included in about 2 wt % to about 50 wt % based on total 100 wt % of the composition for a light conversion layer (total solid content).

If the amount of the quantum dots is less than about 1 wt %, light conversion efficiency in a light conversion layer formed using the composition for a light conversion layer of an exemplary embodiment may be degraded. In addition, if the amount of the quantum dots is greater than about 60 wt %, light output ratio of light in a wavelength region supplied to the quantum dots may be reduced when compared with light in a wavelength region converted by the quantum dot, and color reproducibility of the light conversion layer may be degraded.

The composition for a light conversion layer may include one or two or more different kinds of quantum dots. Particularly, in case where a blue light source is used, in order to provide light passed through the light conversion layer as white light, the composition for a light conversion layer may include first a quantum dot emitting light in a wavelength region of about 520 nm to about 550 nm and a second quantum dot emitting light in a wavelength region of about 620 nm to about 650 nm. In addition, in case where the difference between the central light-emitting wavelengths of the first quantum dot and the second quantum dot is about 80 nm or more, even better color reproducibility may be achieved.

In case where the composition for a light conversion layer includes both the first quantum dot and the second quantum dot, the amount ratio of the first quantum dot and the second quantum dot is not specifically limited, but the amount of the first quantum dot having the central light-emitting wavelength in a relatively short wavelength among a plurality of quantum dots may be about 1 to about 20 times with respect to the amount of the second quantum dot. For example, the amount of the first quantum dot may be 2 to 10 times the amount of the second quantum dot based on a weight, or the amount of the first quantum dot may be 4 to 10 times the amount of the second quantum dot based on a weight.

The composition for a light conversion layer of an exemplary embodiment may include a thiol compound. The composition for a light conversion layer of an exemplary embodiment may include a thiol compound having at least one thiol group in a molecule. The thiol compound may improve the reliability of the composition for a light conversion layer. In addition, the thiol compound may play the role of improving the reliability of the light conversion layer formed using the composition for a light conversion layer. For example, the thiol compound may prevent or suppress the oxidation or discoloration of the quantum dots in the composition for a light conversion layer during a high-temperature process. Accordingly, the thiol compound may improve the reliability of the composition for a light conversion layer and may prevent or suppress the deterioration of light efficiency in a light conversion layer which is formed using the composition for a light conversion layer of an exemplary embodiment.

The thiol compound included in the composition for a light conversion layer of an exemplary embodiment may include one to six thiol groups in a molecule. The thiol compound according to an exemplary embodiment may be represented by the following Formula 1:

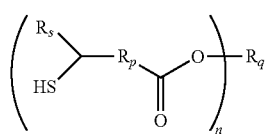

[Formula 1]

In Formula 1, $R_s$ may be a hydrogen atom, a deuterium atom, or a substituted or unsubstituted alkyl group of 1 to 12 carbon atoms, and $R_p$ may be a substituted or unsubstituted alkylene group of 1 to 12 carbon atoms.

In addition, in Formula 1, $R_q$ may be a substituted or unsubstituted alkyl group of 1 to 12 carbon atoms, a substituted or unsubstituted alkoxy group of 1 to 12 carbon atoms, or a substituted or unsubstituted heterocyclic group of 2 to 6 carbon atoms for forming a ring. In addition, n is an integer of 1 to 6.

For example, in the thiol compound represented by Formula 1, n may be an integer of 2 to 4. Particularly, the thiol compound according to an exemplary embodiment may have two to four thiol groups in a molecular unit.

The composition for a light conversion layer according to an exemplary embodiment may include a thiol compound having two or four thiol groups in one molecular unit. Meanwhile, the composition for a light conversion layer according to an exemplary embodiment may essentially include a thiol compound having four thiol groups in one molecular unit.

Meanwhile, the alkyl group may be a linear, branched or cyclic type in the present disclosure. The carbon number of the alkyl group may be 1 to 50, 1 to 30, 1 to 20, 1 to 10, or 1 to 6. Examples of the alkyl group may include a methyl group, an ethyl group, a n-propyl group, an isopropyl group, a n-butyl group, a s-butyl group, a t-butyl group, a i-butyl group, a 2-ethylbutyl group, a 3,3-dimethylbutyl group, a n-pentyl group, a i-pentyl group, a neopentyl group, a t-pentyl group, a cyclopentyl group, a 1-methylpentyl group, a 3-methylpentyl group, a 2-ethylpentyl group, a 4-methyl-2-pentyl group, a n-hexyl group, a 1-methylhexyl group, a 2-ethylhexyl group, a 2-butylhexyl group, a cyclohexyl group, a 4-methylcyclohexyl group, a 4-t-butylcyclohexyl group, a n-heptyl group, a 1-methylheptyl group, a 2,2-dimethylheptyl group, a 2-ethylheptyl group, a 2-butylheptyl group, a n-octyl group, a t-octyl group, a 2-ethyloctyl group, a 2-butyloctyl group, a 2-hexyloctyl group, a 3,7-dimethyl group, a cyclooctyl group, a n-nonyl group, a n-decyl group, an adamantyl group, a 2-ethyldecyl group, a 2-butyldecyl group, a 2-hexyldecyl group, a 2-octyldecyl group, a n-undecyl group, a n-dodecyl group, a 2-ethyldodecyl group, a 2-butyldodecyl group, a 2-hexyldodecyl group, a 2-octyldodecyl group, a n-tridecyl group, a n-tetradecyl group, a n-pentadecyl group, a n-hexadecyl group, a 2-ethylhexadecyl group, a 2-butylhexadecyl group, a 2-hexylhexadecyl group, a 2-octylhexadecyl group, a n-heptadecyl group, a n-octadecyl group, a n-nonadecyl group, a n-eicosyl group, a 2-ethyleicocyl group, a 2-butyleicocyl group, a 2-hexyleicocyl group, a 2-octyleicocyl group, a n-henicosyl group, a n-docosyl group, a n-tricosyl group, a n-tetracosyl group, a n-pentacosyl group, a n-hexacosyl group, a n-heptacosyl group, a n-octacosyl group, a n-nonacosyl group, and a n-triacontyl group, without limitation.

In the present disclosure, the explanation on the alkyl group may be applied to an alkylene group except that the alkylene group is a divalent group. For example, the alkylene group may be a methylene group, an ethylene group, a propylene group, a butylene group, a pentylene group, a hexylene group, a xylene group, a heptylene group, an octylene group, a nonylene group, a decanylene group, an undecanylene group, a dodecanylene group, a tridecanylene group, a tetradecanylene group, a hexadecanylene group, a heptadecanylene group, and a nonadecanylene group, without limitation.

In the present disclosure, an alkoxy group may be a linear, branched or cyclic chain. The carbon number of the alkoxy group is not specifically limited, but may be, for example, 1 to 20, or 1 to 10. Examples of the alkoxy group may be methoxy, ethoxy, n-propoxy, isopropoxy, butoxy, pentyloxy, hexyloxy, octyloxy, nonyloxy, and decyloxy, without limitation.

In the present disclosure, a heterocyclic group may include one or more among B, O, N, P, Si and S as a heteroatom. In case where the heterocyclic group includes two or more heteroatoms, the two or more heteroatoms may be the same or different. The heterocyclic group may be a monocyclic heterocyclic group or a polycyclic heterocyclic group, and may be a concept including a heteroaryl group.

In the description, the term "substituted or unsubstituted" corresponds to substituted or unsubstituted with at least one substituent selected from the group consisting of a deuterium atom, a halogen atom, a cyano group, a nitro group, an amino group, a silyl group, an oxy group, a thiol group, a sulfinyl group, a sulfonyl group, a carbonyl group, a boron group, a phosphine oxide group, a phosphine sulfide group, an alkyl group, an alkenyl group, an alkoxy group, a hydrocarbon ring group, an aryl group and a heterocyclic group. In addition, each of the substituents may be substituted or unsubstituted. For example, a biphenyl group may be interpreted as an aryl group or a phenyl group substituted with a phenyl group.

The thiol compound may include at least one among the following Compound TC-1 to Compound TC-6:

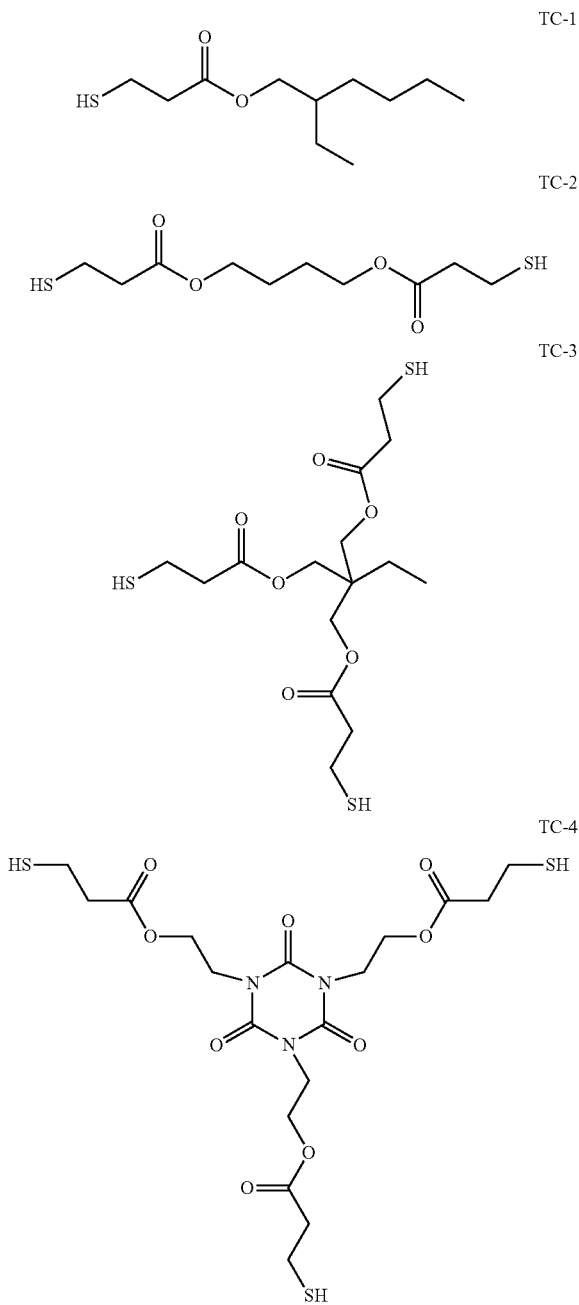

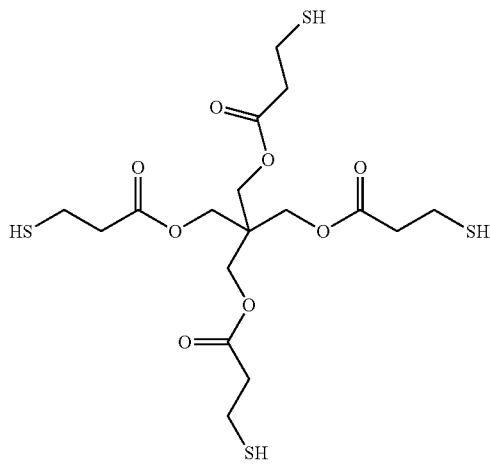

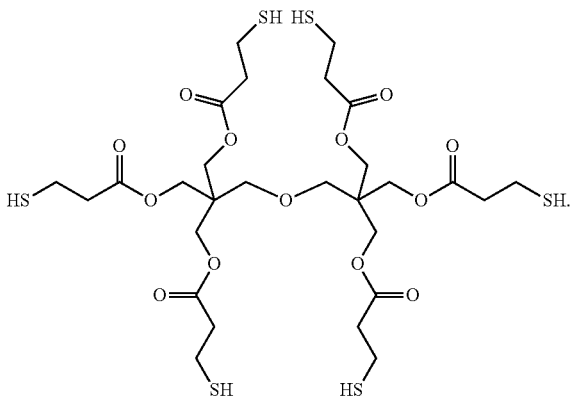

The thiol compound included in the composition for a light conversion layer of an exemplary embodiment may improve the reliability of a light conversion layer formed using the composition for a light conversion layer of an exemplary embodiment. For example, the thiol compound according to an exemplary embodiment may improve the reliability on blue light of the light conversion layer of an exemplary embodiment.

In the composition for a light conversion layer of an exemplary embodiment, the thiol compound may be included in about 10 wt % to about 40 wt % based on 100 wt % of the total composition for a light conversion layer (total solid content). Particularly, the composition for a light conversion layer may include the thiol compound in about 15 wt % to about 30 wt %. In case where the amount of the thiol compound is about 10 wt % to about 40 wt % based on 100 wt % of the total composition for a light conversion layer (total solid content), light resistance of a light conversion layer formed using the composition for a light conversion layer of an exemplary embodiment may be improved. Meanwhile, if the amount of the thiol compound is less than about 10 wt %, light resistance of a light conversion layer formed using the composition for a light conversion layer of an exemplary embodiment may be reduced. In addition, if the amount of the thiol compound is greater than about 40 wt %, the hardness of a coated layer of a light conversion layer formed using the composition for a light conversion layer of an exemplary embodiment may be reduced.

The composition for a light conversion layer of an exemplary embodiment may include a thermal curing agent. For example, the thermal curing agent may include at least one among a polyfunctional alicyclic epoxy resin, a novolak epoxy resin, and a silane epoxy resin.

The thermal curing agent may prevent or suppress the yellowing of a light conversion layer formed using the composition for a light conversion layer of an exemplary embodiment under high-temperature conditions. In addition, the thermal curing agent may prevent or suppress the decrease of the light-emitting efficiency of the quantum dot according to the lapse of time.

The thermal curing agent may be represented by Formula 2 or Formula 3.

[Formula 2]

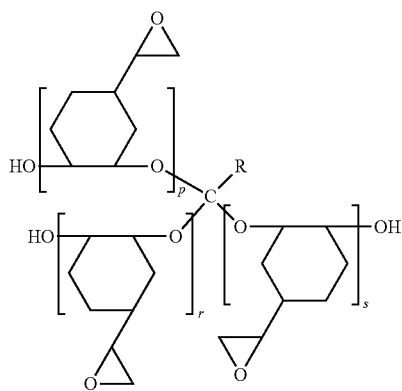

In Formula 2, p, r and s may be each independently an integer of 1 to 20. In addition, R may be a substituted or unsubstituted alkyl group of 1 to 10 carbon atoms.

[Formula 3]

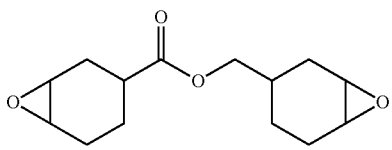

For example, the composition for a light conversion layer of an exemplary embodiment may further include a commercially available thermal curing agent. Particularly, the thermal curing agent may use "CEL-2021" which is an alicyclic epoxy resin of Dicel Chemical Industries, Ltd., "EHPE-3150" which is an alicyclic solid-type epoxy resin, "PB3600" which is an epoxidized polybutadiene, "CEL-2081" which is a flexible alicyclic epoxy compound, "PCL-G" which is a lactone modified epoxy resin, etc. In addition, "CELLOXIDE 2000", "EPLOIDE GT-3000", "GT04000", etc. of Dicel Chemical Industries, Ltd. may be used. However, an exemplary embodiment is not limited thereto.

In the composition for a light conversion layer of an exemplary embodiment, the thermal curing agent may be included in about 10 wt % to about 40 wt % based on 100 wt % of the total composition for a light conversion layer (total solid content). Particularly, the composition for a light conversion layer of an exemplary embodiment may include the thermal curing agent in about 20 wt % to about 30 wt %. If the amount of the thermal curing agent is about 10 wt % to about 40 wt % based on total 100 wt % of the composition for a light conversion layer (total solid content), reliability at a high-temperature process may be improved. That is, yellowing of the light conversion layer formed using the composition for a light conversion layer of an exemplary embodiment may not be generated at a high-temperature process, and defects of decreasing the light-emitting efficiency of the quantum dots may not arise. Meanwhile, if the amount of the thermal curing agent is less than about 10 wt %, the hardness of a coated layer of the light conversion layer formed using the composition for a light conversion layer may be reduced. In addition, if the amount of the thermal curing agent is greater than about 40 wt %, the light-emitting efficiency of the quantum dots in the light conversion layer formed using the composition for a light conversion layer may be reduced.

The composition for a light conversion layer of an exemplary embodiment may further include scattering particles. The scattering particles may be inorganic particles. For example, the scattering particles may be metal oxide particles.

The metal oxide may be an oxide including at least one metal selected from the group consisting of Li, Be, B, Na, Mg, Al, Si, K, Ca, Sc, V, Cr, Mn, Fe, Ni, Cu, Zn, Ga, Ge, Rb, Sr, Y, Mo, Cs, Ba, La, Hf, W, Ti, Pb, Ce, Pr, Nd, Pm, Sm, Eu, Gd, Tb, Dy, Ho, Er, Tm, Yb, Ti, Sb, Sn, Zr, Nb, Ce, Ta, In, and a combination thereof. However, an exemplary embodiment is not limited thereto.

Particularly, the scattering particle may include at least one selected from the group consisting of $Al_2O_3$, $SiO_2$, ZnO, $ZrO_2$, $BaTiO_3$, $TiO_2$, $Ta_2O_5$, $Ti_3O_5$, ITO, IZO, ATO, ZnO—Al, $Nb_2O_3$, SnO, MgO and a combination thereof.

In addition, the scattering particle may be surface treated with a compound having an unsaturated bond such as acrylate. The surface treated scattering particles may show improved dispersibility in a base resin.

An average diameter of the scattering particles may be about 50 nm to about 1,000 nm, particularly, about 100 nm to about 500 nm. If the size of the scattering particle is less than about 50 nm, light emitted from the quantum dot may be insufficiently scattered, and if the size of the scattering particle is greater than about 1,000 nm, the scattering particles may be precipitated in the composition for a light conversion layer or a uniform surface may not be obtained during forming a light conversion layer.

The scattering particles included in the composition for a light conversion layer of an exemplary embodiment may change the path of light emitted from the quantum dots to diverse directions to increase light extraction efficiency at a light conversion layer. The scattering particles may be included in about 0.5 wt % to about 20 wt % with respect to the total weight (total solid content) of the composition for a light conversion layer. For example, the scattering particles may be included in about 1 wt % to about 15 wt %, or about 1 wt % to about 10 wt % based on the total weight of the composition for a light conversion layer.

In the composition for a light conversion layer of an exemplary embodiment, if the amount of the scattering particles is less than about 0.5 wt %, light extraction efficiency at a light conversion layer which is formed using the composition for a light conversion layer of an exemplary embodiment may be reduced. Meanwhile, in the composition for a light conversion layer of an exemplary embodiment, if the amount of the scattering particles is greater than about 20 wt %, the transmittance of light supplied to the quantum dots may decrease to degrade color reproducibility.

The composition for a light conversion layer of an exemplary embodiment may further include at least one solvent. For example, the composition for a light conversion layer of an exemplary embodiment may be a solventless type including a base resin, quantum dots and a thiol compound, or a solvent type further including at least one solvent in addition to a base resin, quantum dots and a thiol compound.

The composition for a light conversion layer of an exemplary embodiment may include one or two or more kinds of solvents. In case where the composition for a light conversion layer of an exemplary embodiment includes a solvent, the composition for a light conversion layer may include at least one solvent having a boiling point of about 100° C. to about 180° C. In case where the composition for a light conversion layer includes a plurality of solvents, the solvent having a boiling point of about 100° C. to about 180° C. may be included in about 50% or more based on the total weight of the solvents. The composition for a light conversion layer of an exemplary embodiment may include at least one solvent having a boiling point of about 100° C. to about 180° C. and may improve the flowability of the composition for a light conversion layer. Accordingly, the generation of coating stains and dried foreign materials in the light conversion layer formed using the composition for a light conversion layer may be restrained, and the light conversion layer may show improved layer properties. For example, in case where a solvent having a boiling point of less than about 100° C. is included in about 50% or more with respect to the total solvent, a drying rate of the solvent may increase and stains may be formed on a layer surface during forming the light conversion layer. In addition, in case where a solvent having a boiling point of greater than about 180° C. is included in about 50% or more with respect to the total solvent, a drying rate of the solvent may decrease and defects of increasing tack time may arise.

The composition for a light conversion layer of an exemplary embodiment may include at least one solvent selected from the group consisting of ethers, aromatic hydrocarbons, ketones, alcohols, esters and amides. For example, the composition for a light conversion layer may include at least one solvent selected from the group consisting of propylene glycol monomethyl ether acetate (boiling point: about 145 to 147° C.), ethylene glycol monomethyl ether (boiling point: about 124 to 125° C.), ethylene glycol monoethyl ether (boiling point: about 135.6° C.), methyl cellosolve acetate (boiling point: about 145° C.), ethyl cellosolve acetate (boiling point: about 156° C.), toluene (boiling point: about 110.6° C.), xylene (boiling point: about 138.4° C.), mesitylene (boiling point: about 164.7° C.), methyl amyl ketone (boiling point: about 151° C.), methyl isobutyl ketone (boiling point: about 116.1° C.), cyclohexanone (boiling point: about 155.6° C.), butanol (boiling point: about 117.7° C.), hexanol (boiling point: about 157° C.), cyclohexanol (boiling point: about 161.8° C.), ethyl 3-ethoxypropionate (boiling point: about 166° C.), 1,3-butylene glycol diacetate (boiling point: about 207° C.), ethyl-3-ethoxypropionate (boiling point: about 166° C.), propylene glycol diacetate (boiling point: about 220° C.), ethylene glycol monopropyl ether (boiling point: about 150° C. to 152° C.), ethylene glycol monobutyl ether (boiling point: about 171° C.), diethylene glycol diethyl ether (boiling point: about 189° C.), methoxybutyl acetate (boiling point: about 172° C.), ethylene glycol (boiling point: about 197.3° C.) and γ-butyrolactone (about 204° C.).

In case where the composition for a light conversion layer of an exemplary embodiment is the solvent-type, the solvent may be included in about 50 wt % to about 90 wt % with respect to the total weight of the composition for a light conversion layer of an exemplary embodiment (total weight including the solid content and the solvent). For example, the solvent-type composition for a light conversion layer of an exemplary embodiment may include the solvent in about 60 wt % to about 85 wt % with respect to the total weight of the composition for a light conversion layer. Meanwhile, in the solvent-type composition for a light conversion layer, the remaining solid content excluding the solvent may be included in about 10 wt % to about 50 wt % with respect to the total weight of the composition for a light conversion layer. The base resin, the quantum dot and the thiol compound, which are the solid contents may be included in about 20 wt % to about 89 wt %, about 1 wt % to about 60 wt %, and about 10 wt % to about 40 wt %, respectively, based on the total weight of the solid content.

In case where the composition for a light conversion layer of an exemplary embodiment includes the solvent in about 50 wt % to about 90 wt %, improved coatability may be shown. That is, the composition for a light conversion layer of an exemplary embodiment may include the solvent in about 50 wt % to about 90 wt % and may improve the coatability of the composition for a light conversion layer provided using diverse apparatuses such as a roll coater, a spin coater, a slit and die coater, a slit coater, and an ink jet coater.

The composition for a light conversion layer of an exemplary embodiment includes the base resin, the quantum dots, and the thiol compound having at least one thiol group, and may show improved reliability in case of being exposed to high-temperature conditions or light.

Hereinafter, a light conversion layer according to an exemplary embodiment and an electronic device of an exemplary embodiment including the same will be explained with reference to the accompanying drawings.

Figure 2:
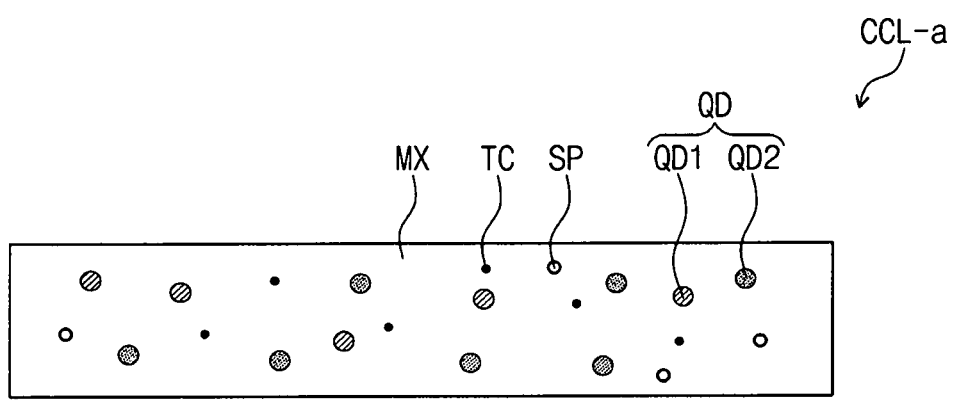
FIG. 2 is a cross-sectional view of a light conversion layer of an exemplary embodiment.

FIG. 1 and FIG. 2 are cross-sectional views showing light conversion layers of embodiments, respectively. The light conversion layers CCL and CCL-a of embodiments may include a matrix part MX, quantum dots QD, and a thiol compound TC.

The matrix part MX may be formed from the base resin explained above in the composition for a light conversion layer of an exemplary embodiment. For example, the matrix part MX may be formed from an acrylic resin. The matrix part MX may be formed by solidifying a base resin in a high-temperature process or an ultraviolet treatment process.

The same explanation on the composition for a light conversion layer of an exemplary embodiment may be applied to the base resin forming the matrix part MX.

The quantum dots QD may be dispersed in the matrix part MX. The light conversion layers CCL and CCL-a may include a first quantum dot QD1 and a second quantum dot QD2. The first quantum dot QD1 may be for converting first color light which is provided from a light source part LP, which will be explained later, into second color light, and the second quantum dot QD2 may be for converting the first color light into third color light.

The first color light may be blue light. The first quantum dot QD1 may be a green quantum dot which may be excited by the first color light which is blue light and emit the second color light which is green light, and the second quantum dot QD2 may be a red quantum dot which may be excited by the first color light and emit the third color light which is red light.

Meanwhile, the light conversion layer CCL-a of an exemplary embodiment as shown in FIG. 2 may further include scattering particles SP. The same explanation referring to the composition for a light conversion layer will be applied to the quantum dots QD, the thiol compound TC and the scattering particles SP, included in the light conversion layers CCL and CCL-a of embodiments as shown in FIG. 1 and FIG. 2.

That is, the light conversion layers CCL and CCL-a of embodiments may include a thiol compound TC having at least one thiol group in a molecule. The thiol compound may include one to six thiol groups. For example, the thiol compound may have two to four thiol groups in a molecule.

In the light conversion layers CCL and CCL-a of embodiments, the thiol compound TC may be included in about 10 wt % to about 40 wt % based on the total weight of the light conversion layers CCL and CCL-a. The light conversion layers CCL and CCL-a of embodiments may include about 10 wt % to about 40 wt % of the thiol compound TC based on the total weight of the light conversion layers CCL and CCL-a and may show improved reliability properties. For example, about 10 wt % to about 40 wt % of the thiol compound TC may be included based on the total weight of the light conversion layers CCL and CCL-a of embodiments and improved light resistance may be shown.

Figure 3:
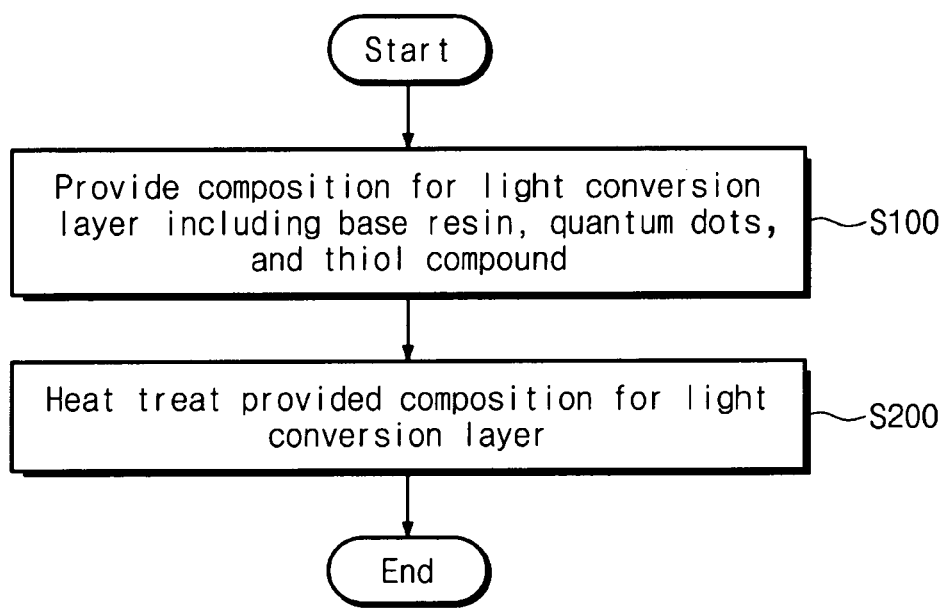
FIG. 3 is a flowchart showing a method for forming a light conversion layer of an exemplary embodiment.

FIG. 3 is a flowchart schematically showing a method for forming light conversion layers CCL and CCL-a of embodiments, shown in FIG. 1 and FIG. 2. A method for forming a light conversion layer may include a step of providing a composition for a light conversion layer, including a base resin, quantum dots and a thiol compound (S100) and a step of heat treating the composition for a light conversion layer thus provided (S200).

The step of providing the composition for a light conversion layer (S100) may be supplying of a composition for a light conversion layer, including a base resin, quantum dots and a thiol compound on a base substrate. The composition for a light conversion layer may be supplied on the base substrate using diverse methods such as slit coating, spin coating, roll coating, spray coating, ink jet printing, etc.

The base substrate may be a member providing a base surface for providing a light conversion layer. The base substrate may be a separately provided glass substrate, metal substrate, plastic substrate, etc. In addition, differently, the base substrate may be any one among members provided adjacent to a light conversion layer and included in a display panel (DP, FIG. 5).

The step of heat treating the composition for a light conversion layer (S200) may be performed at a temperature of about 150° C. to about 250° C. For example, the step of heat treating the composition for a light conversion layer (S200) may be performed at a temperature of about 150° C. to about 200° C. After performing the step of heat treating the composition for a light conversion layer (S200), the composition for a light conversion layer may be thermally cured and provided as a light conversion layer.

That is, the light conversion layer of an exemplary embodiment, which is provided by heat treating the composition for a light conversion layer, including the quantum dots and the thiol compound may show improved heat resistance and light resistance. That is, the light conversion layer of an exemplary embodiment may show improved color reproducibility and light-emitting efficiency properties as well as improved reliability.

An electronic device of an exemplary embodiment may include a light conversion layer. The light conversion layer included in the electronic device according to an exemplary embodiment may be the light conversion layers explained referring to FIG. 1 to FIG. 3. The light conversion layer may include a matrix part, at least one quantum dot and a thiol compound having at least one thiol group, as explained above referring to FIG. 1 and FIG. 2. Meanwhile, the same explanation on the quantum dot and the thiol compound above may be applied to the quantum dot and the thiol compound used in the light conversion layer which is included in the electronic device of an exemplary embodiment.

Figure 4:
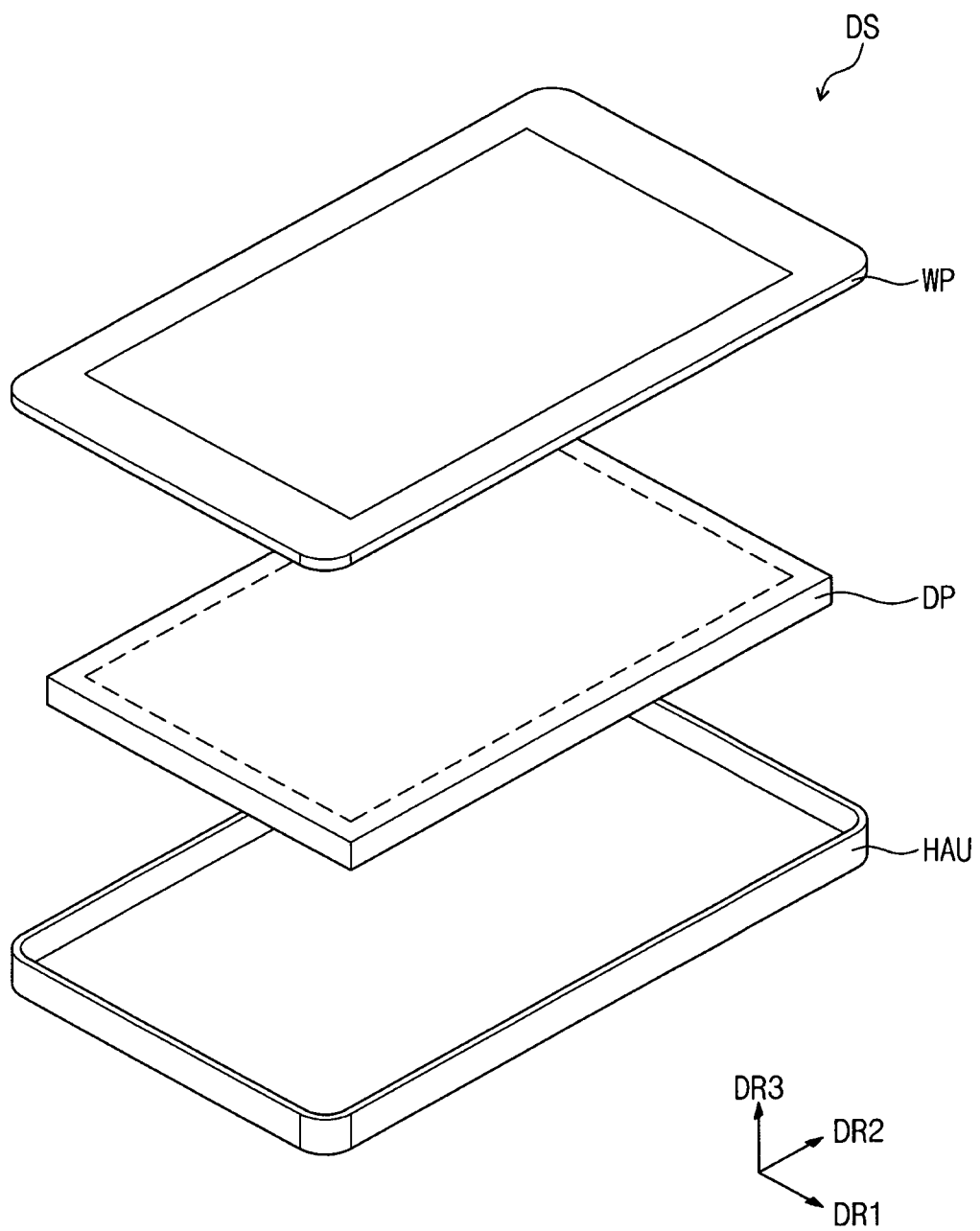
FIG. 4 is an exploded perspective view of an electronic device of an exemplary embodiment.
Figure 5:
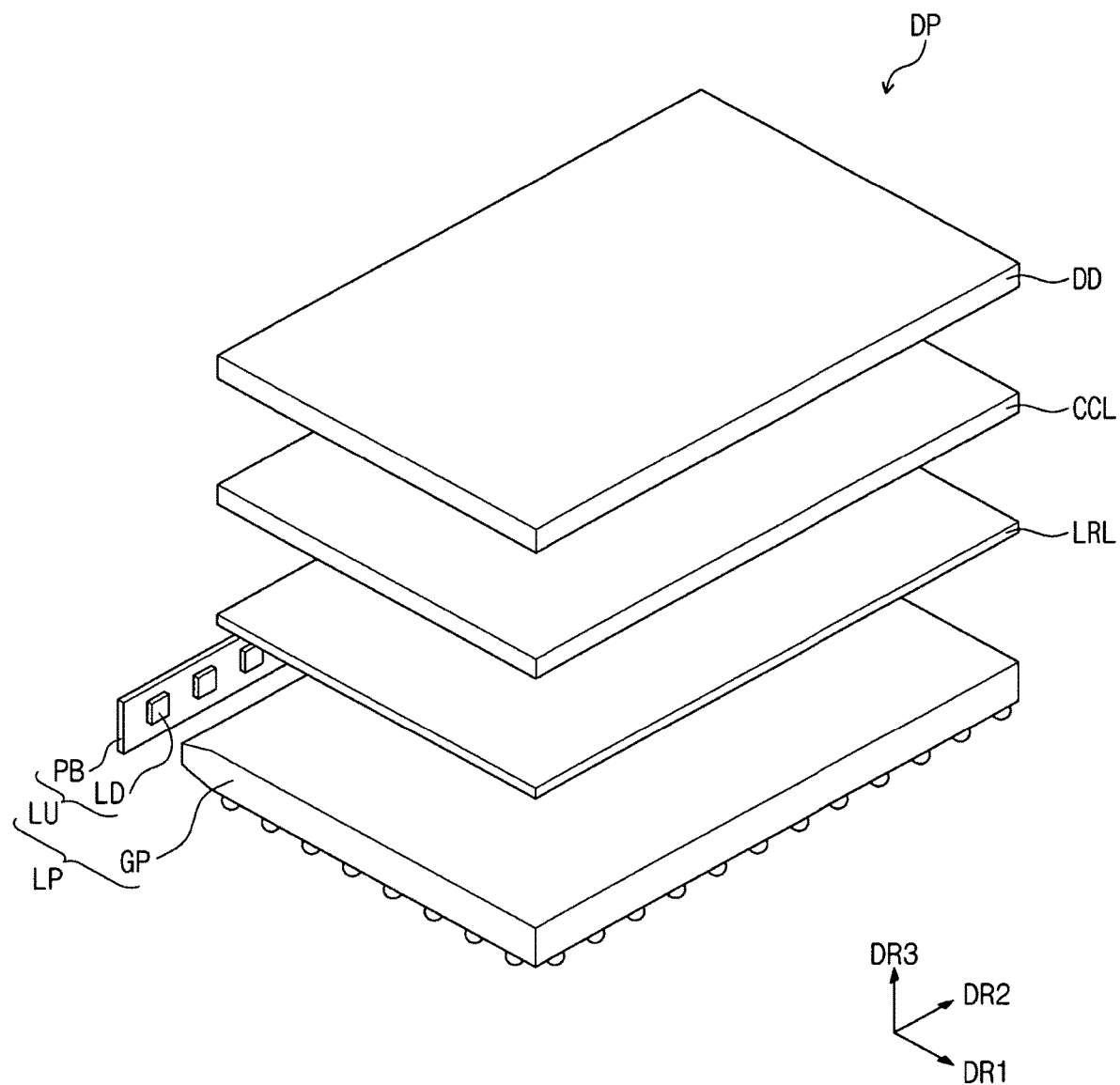
FIG. 5 is an exploded perspective view of a display panel according to an exemplary embodiment.

FIG. 4 is an exploded perspective view of an electronic device DS of an exemplary embodiment. FIG. 5 is an exploded perspective view of a display panel included in an electronic device according to an exemplary embodiment. The electronic device DS of an exemplary embodiment may include various elements which are activated by electrical signals, such as a display element, a touch element, and a detection element. The electronic device DS of an exemplary embodiment may include a window member WP, a display panel DP and a housing HAU.

In an exemplary embodiment, the electronic device DS may include a display element and may be a display device providing images. For example, the electronic device DS may be a liquid crystal display device or an organic electroluminescence display device. That is, in the electronic device DS of an exemplary embodiment, the display panel DP may include a liquid crystal display element or an organic electroluminescence display element.

As shown in FIG. 5, the display panel DP according to an exemplary embodiment may include a light source part LP and a display element DD. The display panel DP may include a light conversion layer CCL disposed on the light source part LP. The light source part LP may include a light source unit LU and a guide panel GP, and the light source unit LU may provide blue light which is first color light.

The light source unit LU may include a circuit board PB and a light-emitting element LD disposed on the circuit board PB. The light conversion layer CCL may convert the wavelength of light provided from the light source part LP to supply toward a display surface side of the display panel DP. In addition, the display panel DP of an exemplary embodiment may include a low refraction layer LRL disposed under the light conversion layer CCL.

That is, the display panel according to an exemplary embodiment, as shown in FIG. 5 may include a light source part LP providing first color light, and a light conversion layer CCL disposed on the light source part LP, and the light conversion layer CCL may include a matrix part, at least one quantum dot converting the wavelength of first color light, and a thiol compound having at least one thiol group, as in the light conversion layers of FIG. 1 to FIG. 2, and improved color reproducibility and high light efficiency may be maintained even though exposed to heat or light for a long time.

Meanwhile, the light conversion layer of an exemplary embodiment may be included in diverse types of display panels in addition to the display panel shown in FIG. 5. Different from FIG. 5, the light conversion layer may be included in a display element. For example, the light conversion layer may be included in a liquid crystal display element or an organic electroluminescence display element. Meanwhile, the light conversion layer may include a plurality of light conversion parts which are separated from each other on a plane. In this case, the plurality of the light conversion parts may include different quantum dots, and may emit light in different wavelength regions.

The electronic device of an exemplary embodiment includes a light conversion layer including quantum dots on a light source part and the light conversion layer includes a thiol compound, and thus, the electronic device may maintain improved color reproducibility and high light efficiency even though exposed to heat or light for a long time.

Hereinafter, a composition for a light conversion layer according to an exemplary embodiment and a light conversion layer according to an exemplary embodiment, which is formed using the composition for a light conversion layer of an exemplary embodiment, will be explained in particular referring to embodiments and comparative embodiments. In addition, the embodiments illustrated below are only illustrations to assist the understanding, and the scope is not limited thereto.

[Exemplary Synthesis]

(1) Exemplary Synthesis of Green Quantum Dot (QD1)

0.4 mmol (0.058 g) of indium acetate, 0.6 mmol (0.15 g) of palmitic acid and 20 ml of 1-octadecene were put in a reactor and heated to about 120° C. in vacuum. After 1 hour, the atmosphere in the reactor was replaced with nitrogen. After heating to about 280° C., a mixture solution of 0.2 mmol (58 µl) of tris(trimethylsilyl)phosphine (TMS3P) and 1.0 ml of trioctylphosphine was rapidly injected and reacted for about 1 minute to synthesize InP.

Then, 2.4 mmol (0.448 g) of zinc acetate, 4.8 mmol of oleic acid and 20 ml of trioctylamine were put in a reactor and heated to about 120° C. in vacuum. After 1 hour, the atmosphere in the reactor was replaced with nitrogen, and the reactor was heated to about 280° C. 2 ml of an InP core solution synthesized above was put, and then, 4.8 mmol of selenium in trioctylphosphine (Se/TOP) was put, and a final mixture was reacted for about 2 hours. To a reaction solution rapidly cooled to room temperature, ethanol was added, and centrifugal process was performed to obtain a precipitation, and the precipitate was filtered under a reduced pressure and dried under a reduced pressure to form an InP/ZnSe core-shell.

After that, 2.4 mmol (0.448 g) of zinc acetate, 4.8 mmol of oleic acid and 20 ml of trioctylamine were put in a reactor and heated to about 120° C. in vacuum. After 1 hour, the atmosphere in the reactor was replaced with nitrogen, and the reactor was heated to about 280° C. 2 ml of an InP core solution synthesized above was put, and then, 4.8 mmol of sulfur in trioctylphosphine (S/TOP) was put, and a final mixture was reacted for about 2 hours. To a reaction solution rapidly cooled to room temperature, ethanol was added, and centrifugal process was performed to obtain a precipitation. The precipitate was filtered under a reduced pressure and dried under a reduced pressure to form quantum dots of an InP/ZnSe/ZnS core-shell structure.

In the light-emitting spectrum of the quantum dots thus obtained, the maximum light-emitting peak was found to about 535 nm, and the quantum dot was secured to a green quantum dot.

(2) Exemplary Synthesis of Red Quantum Dot (QD2)

0.2 mmol (0.058 g) of indium acetate, 0.6 mmol (0.15 g) of palmitic acid and 10 ml of 1-octadecene were put in a reactor and heated to about 120° C. in vacuum. After 1 hour, the atmosphere in the reactor was replaced with nitrogen. After heating to about 280° C., a mixture solution of 0.1 mmol (29 µl) of tris(trimethylsilyl)phosphine (TMS3P) and 0.5 ml of trioctylphosphine was rapidly injected and reacted for about 20 minutes. To the reaction solution cooled to room temperature, acetone was added and centrifugal process was performed. The precipitate thus obtained was dispersed in toluene. InP semiconductor nanocrystal thus obtained showed the maximum light-emitting peak at about 560 nm to about 590 nm.

After that, 1.2 mmol (0.224 g) of zinc acetate, 2.4 mmol of oleic acid and 10 ml of trioctylamine were put in a reactor and heated to about 120° C. in vacuum. After 1 hour, the atmosphere in the reactor was replaced with nitrogen, and the reactor was heated to about 280° C. 1 ml of the InP core solution synthesized above was put, and then, 2.4 mmol of sulfur (S)/trioctylphosphine (TOP) was put, and a final mixture was reacted for about 2 hours. To a reaction solution rapidly cooled to room temperature, ethanol was added, and centrifugal process was performed to obtain quantum dots of an InP (core)/ZnS (shell) structure having the maximum light-emitting peak of about 636 nm.

(3) Exemplary Synthesis of the Base Resin

A flask equipped with a stirrer, a thermometer, a reflux condenser, a dropping lot and a nitrogen inlet tube was prepared, and 45 parts by weight of N-benzylmaleimide, 45 parts by weight of methacrylic acid, 10 parts by weight of tricyclodecyl methacrylate, 4 parts by weight of t-butylperoxy-2-ethylhexanoate and 40 parts by weight of propylene glycol monomethyl ether acetate (hereinafter, "PGMEA") were injected and mixed by stirring to prepare a monomer dropping lot, and then, 6 parts by weight of n-dodecanthiol and 24 parts by weight of PGMEA were added and mixed by stirring to prepare a chain transfer agent dropping lot. Then, 395 parts by weight of PGMEA was put in the flask, the inner air atmosphere of the flask was replaced with nitrogen, and the temperature of the flask was elevated to about 90° C. while stirring. Then, the dropping of the monomer and chain transfer agent was initiated from the dropping lots. The dropping was performed for about 2 hours for each while keeping the temperature of about 90° C. After 1 hour, the temperature was elevated to about 110° C. and kept for about 3 hours. Through a gas inlet tube, the bubbling of a mixture gas of oxygen/nitrogen=5/95 (v/v) was initiated. Then, 10 parts by weight of glycidyl methacrylate, 0.4 parts by weight of 2,2'-methylenebis(4-methyl-6-t-butylphenol) and 0.8 parts by weight of triethylamine were injected into the flask, and reaction was performed at about 110° C. for about 8 hours. Then, the reaction product was cooled to room temperature to obtain a base resin having the solid content of about 29.1 wt %, a weight average molecular weight of about 32,000, and an acid value of about 114 mgKOH/g.

[Composition for Light Conversion Layer]

In Table 1 below, the configurations of the compositions for light conversion layers of the Examples and the Comparative Example are shown. In Table 1, weight ratios on solvent-type compositions for a light conversion layer are shown. The weight of each configuration component shown in Table 1 corresponds to wt %.

TABLE 1

| Division | Quantum dots | | Scattering particles | Base resin | Thiol compound | | | | Thermal curing agent | Solvent |
| --- | --- | --- | --- | --- | --- | --- | --- | --- | --- | --- |
| | QD1 | QD2 | | | TC-5 | TC-1 | TC-3 | TC-6 | | |
| Example 1 | 3 | 0.45 | 0.75 | 13.5 | 4.8 | — | — | — | 7.5 | 70 |
| Example 2 | 3 | 0.45 | 0.75 | 11.7 | 6.6 | — | — | — | 7.5 | 70 |
| Example 3 | 3 | 0.45 | 0.75 | 10.5 | 8.4 | — | — | — | 6.9 | 70 |
| Example 4 | 3 | 0.45 | 0.75 | 11.7 | 5.4 | 1.2 | — | — | 7.5 | 70 |
| Example 5 | 3 | 0.45 | 0.75 | 11.7 | 1.2 | 5.4 | — | — | 7.5 | 70 |

TABLE 1-continued

| Division | Quantum dots QD1 | QD2 | Scattering particles | Base resin | TC-5 | TC-1 | TC-3 | TC-6 | Thermal curing agent | Solvent |
|---|---|---|---|---|---|---|---|---|---|---|
| Example 6 | 3 | 0.45 | 0.75 | 11.7 | 1.2 | — | 5.4 | — | 7.5 | 70 |
| Example 7 | 3 | 0.45 | 0.75 | 11.7 | — | 6.6 | — | — | 7.5 | 70 |
| Example 8 | 3 | 0.45 | 0.75 | 11.7 | — | — | 6.6 | — | 7.5 | 70 |
| Example 9 | 3 | 0.45 | 0.75 | 11.7 | — | — | — | 6.6 | 7.5 | 70 |
| Example 10 | 3 | 0.45 | 0.75 | 13.5 | 3.9 | — | — | — | 8.4 | 70 |
| Example 11 | 3 | 0.45 | 0.75 | 10.2 | 9 | — | — | — | 6.6 | 70 |
| Example 12 | 3 | 0.45 | 0.75 | 13.5 | 7.8 | — | — | — | 4.5 | 70 |
| Example 13 | 3 | 0.45 | 0.75 | 9.9 | 5.4 | — | — | — | 10.5 | 70 |
| Comparative Example 1 | 3 | 0.45 | 0.75 | 18.3 | — | — | — | — | 7.5 | 70 |

In the compositions for light conversion layers shown in Table 1, QD1 is the green quantum dot explained in the above exemplary synthesis, and QD2 is the red quantum dot explained in the above exemplary synthesis. As the scattering particles, $TiO_2$ particles (product name: TR-88, average diameter: about 220 nm) of Huntsman Co. were used. As the base resin, the base resin explained in the above exemplary synthesis was used. As the thiol compound, at least one among TC-5, TC-1, TC-3 or TC-6 was used in Example 1 to Example 13, and the thiol compound was not used in Comparative Example 1. As the thermal curing agent, CEL-2021 (Dicel Chemical Industries, Ltd.) was used, and propylene glycol monomethyl ether acetate was used as the solvent.

[Formation of Light Conversion Layer]

The compositions for light conversion layers, having the configurations of Example 1 to Example 13 and Comparative Example 1 as shown in Table 1 were supplied onto a glass substrate and then heat treated to form the light conversion layers of the Examples and the Comparative Example.

Each of the compositions for light conversion layers of Example 1 to Example 13 and Comparative Example 1 was supplied on a glass substrate using a spin coating method, and then the glass substrate was put on a heating plate and stood at a temperature of about 100° C. for about 10 minutes for drying. After that, the glass substrate was heat treated in a heating oven for about 30 minutes to form a light conversion layer. The light conversion layer thus formed was formed to have a thickness of about 15 μm.

Table 2 below shows the compositions for light conversion layers used in the light conversion layers of the Examples and the Comparative Examples and temperature conditions for heat treatment.

TABLE 2

| Division | Composition for light conversion layer | Heat treatment temperature (° C.) |
|---|---|---|
| Example 2-1 | Example 1 | 200 |
| Example 2-2 | Example 2 | 200 |
| Example 2-3 | Example 3 | 200 |
| Example 2-4 | Example 4 | 200 |
| Example 2-5 | Example 5 | 200 |
| Example 2-6 | Example 6 | 200 |
| Example 2-7 | Example 7 | 200 |
| Example 2-8 | Example 8 | 200 |
| Example 2-9 | Example 9 | 200 |
| Example 2-10 | Example 10 | 200 |
| Example 2-11 | Example 11 | 200 |
| Example 2-12 | Example 12 | 200 |
| Example 2-13 | Example 13 | 200 |
| Comparative Example 2-1 | Comparative Example 1 | 200 |
| Comparative Example 2-2 | Example 2 | 140 |
| Comparative Example 2-3 | Example 2 | 260 |

Example 2-1 to Example 2-13 are examples of the light conversion layers formed using the compositions for light conversion layers of Example 1 to Example 13, which were suggested in Table 1, and Comparative Example 2-1 corresponds to a light conversion layer formed using the composition for a light conversion layer of Comparative Example 1 in Table 1. Comparative Example 2-2 and Comparative Example 2-3 used the composition for a light conversion layer of Example 2 in Table 1 and is different from Example 2-2 in heat treatment temperature. The heat treatment temperature of Comparative Example 2-2 was about 140° C., and the heat treatment temperature of Comparative Example 2-3 was about 260° C.

[Evaluation of Light Conversion Layer]

Table 3 shows evaluation results on the light conversion layers formed by the forming conditions in Table 2. In Table 3, evaluation results on the luminance, light resistance and pencil hardness of the light conversion layers are shown.

The luminance value of the light conversion layer was obtained by disposing the light conversion layer formed by the conditions in Table 2 above a blue light source (X-lamp XR-E LED, Royal blue 450, illumination: 15 mW, Cree Co.), blocking external light and air, and measuring using a luminance measurement apparatus (CAS140CT Spectrometer, Instrument systems Co.).

In addition, the results of the light resistance of the light conversion layers shown in Table 3 were obtained by standing the light conversion layers formed by the conditions in Table 2 for about 300 hours under a blue light source (Cree Co.) which was set to emit illumination of about 100 mW at a wavelength of about 450 nm, and measuring luminance change ratios before and after standing by using a luminance measurement apparatus (CAS140CT Spectrometer, Instrument systems Co.). The light resistance represents a luminance change ratio, and the luminance change ratio (%) was calculated from (luminance after standing)/(luminance before standing)×100. In Table 3, the increase of the light resistance value corresponds to the improvement of the light resistance.

In Table 3, the pencil hardness corresponds to the evaluation of the hardness of the light conversion layer. With respect to the light conversion layer formed by the conditions of Table 2, the hardness of a coated layer was measured using a pencil hardness system (Model 191, Yuyu instrument Co., Ltd.).

TABLE 3

| Evaluation result | Luminance (nit) | Light resistance (%) | Pencil hardness |
|---|---|---|---|
| Example 2-1 | 4,176 | 91% | 4H |
| Example 2-2 | 4,239 | 93% | 4H |
| Example 2-3 | 4,330 | 95% | 3H |
| Example 2-4 | 4,219 | 92% | 4H |
| Example 2-5 | 3,863 | 85% | 4H |
| Example 2-6 | 3,539 | 81% | 4H |
| Example 2-7 | 3,468 | 83% | 4H |
| Example 2-8 | 3,619 | 86% | 4H |
| Example 2-9 | 3,420 | 85% | 4H |
| Example 2-10 | 3,681 | 82% | 5H |
| Example 2-11 | 4,620 | 95% | H |
| Example 2-12 | 4,342 | 94% | B |
| Example 2-13 | 3,023 | 92% | 5H |
| Comparative Example 2-1 | 2,843 | 30% | 5H |
| Comparative Example 2-2 | 4,365 | 76% | 2B |
| Comparative Example 2-3 | 2,130 | 83% | 6H |

Referring to Table 3, Example 2-1 to Example 2-13 including the thiol compound in light conversion layers showed improved luminance properties and light resistance when compared with Comparative Example 2-1, not including a thiol compound. That is, the light conversion layers of the Examples included the thiol compound to minimize the damage of the quantum dots included in the light conversion layers, and thus, showed high luminance values and decreased luminance change ratios even though being exposed to blue light for a long time. Meanwhile, Comparative Example 2-2 and Comparative Example 2-3 used the same composition for a light conversion layer as in Example 2-2 and corresponded to change only heat treatment conditions. In Comparative Example 2-2, the composition for a light conversion layer was heat treated at a heat treatment temperature lower than that of Example 2-2, and showed reduced light resistance and hardness properties when compared with Example 2-2. These results are considered to be obtained, because the composition for a light conversion layer was insufficiently cured due to the low heat treatment temperature and mechanical properties were degraded.

In addition, in Comparative Example 2-3, the composition for a light conversion layer was heat treated at a higher heat treatment temperature when compared with Example 2-2, and a lower luminance value and worse light resistance were shown when compared with Example 2-2. These results are considered to be obtained, because the quantum dot and the thiol compound in the composition for a light conversion layer were damaged due to the high heat treatment temperature.

Meanwhile, it may be found that among the Examples, Example 2-1 to Example 2-4 showed better luminance properties and better light resistance than Example 2-5 to Example 2-13. These results are considered to be obtained, because the compositions for light conversion layers of Example 2-1 to Example 2-4 includes the thiol compound of TC-5, which has four thiol groups in about 15 wt % to less than about 30 wt % with respect to the solid content of the compositions for light conversion layers excluding the solvent, and better reliability properties might be shown when compared with the other examples.

Meanwhile, Example 2-12 includes the thiol compound of TC-5 which has four thiol groups in about 15 wt % to less than about 30 wt % with respect to the solid content of the composition for a light conversion layer excluding the solvent, but includes a relatively smaller amount of the thermal curing agent when compared with Example 2-1 to Example 2-4, and thus shows relatively lower hardness.

That is, it may be found that the light conversion layers of Example 2-1 to Example 2-13 include the thiol compound and show improved luminance properties and light resistance, and a good hardness value.

An exemplary embodiment may include a thiol compound having at least one thiol group in a composition for a light conversion layer and the light resistance and heat resistance of the composition for a light conversion layer may be improved. In addition, the light conversion layer of an exemplary embodiment includes the thiol compound having at least one thiol group and may show improved reliability even though exposed to heat or light. In addition, the electronic device of an exemplary embodiment includes a light conversion layer including a quantum dot and a thiol compound, and may show improved color reproducibility and improved reliability.

The composition for a light conversion layer of an exemplary embodiment includes a quantum dot and a thiol compound having at least one thiol group and may show improved reliability properties.

The light conversion layer of an exemplary embodiment includes a thiol compound having at least one thiol group and may show improved reliability with respect to heat or light, and an electronic device including such a light conversion layer may show improved color reproducibility and improved reliability.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:
1. A composition for a light conversion layer, the composition comprising:
a base resin;
quantum dots;
a thiol compound comprising at least one thiol group in a molecule;
a thermal curing agent comprising at least one of a polyfunctional alicyclic epoxy resin, a novolak epoxy resin and a silane epoxy resin; and
a scattering particle, wherein
the base resin is a copolymer formed of an unsaturated imide compound,
the quantum dots include a first quantum dot emitting light in a wavelength region of 520 nm to 550 nm and a second quantum dot emitting light in a wavelength region of 620 nm to 650 nm,
an amount of the first quantum dot is 2 to 10 times of an amount of the second quantum dot based on weight,
the thiol compound is comprised in 13 wt % to 40 wt % based on 100 wt % of a total solid content of the composition for the light conversion layer,
the thermal curing agent is comprised in 10 wt % to 40 wt % based on 100 wt % of the total solid content of the composition for the light conversion layer, the scattering particle is comprised in 0.5 wt % to 20 wt % based on 100 wt % of the total solid content of the composition for the light conversion layer, the total solid content of the composition for the light conversion layer comprises the base resin, the quantum dots, the thiol compound, the thermal curing agent, and the scattering particle, and the thiol compound is represented by Formula 1:

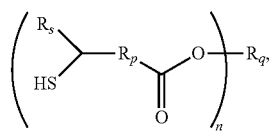

[Formula 1]

wherein in Formula 1, $R_s$ is a hydrogen atom, a deuterium atom, or a substituted or unsubstituted alkyl group of 1 to 12 carbon atoms, $R_p$ is a substituted or unsubstituted alkylene group of 1 to 12 carbon atoms, $R_q$ is a substituted or unsubstituted alkyl group of 1 to 12 carbon atoms, a substituted or unsubstituted alkoxy group of 1 to 12 carbon atoms, or a substituted or unsubstituted heterocyclic group of 2 to 6 carbon atoms for forming a ring, and n is an integer of 2 to 6.

2. The composition for the light conversion layer of claim 1, wherein the thiol compound comprises at least one of the following compounds TC-2, TC-3, TC-4, TC-5, and TC-6:

TC-2

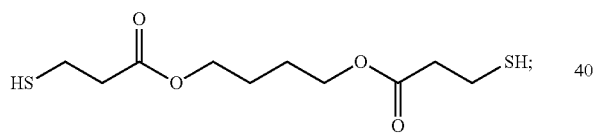

TC-3

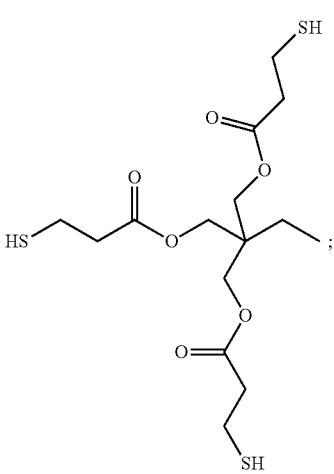

TC-4

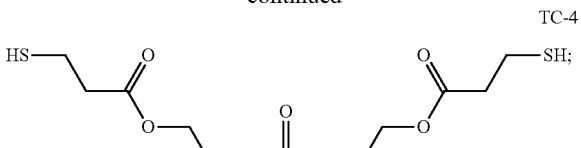

TC-5

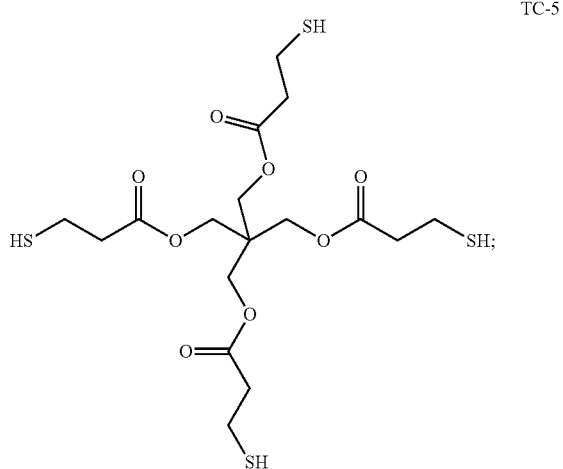

TC-6

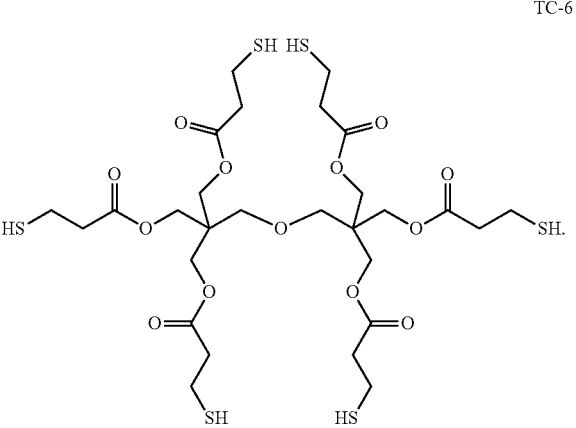

3. The composition for the light conversion layer of claim 1, wherein the base resin is an acrylic resin that is copolymerized with the unsaturated imide compound.

4. The composition for the light conversion layer of claim 1, wherein the base resin is comprised in 20 wt % to 89 wt % based on 100 wt % of the total solid content of the composition for the light conversion layer, and the quantum dots are comprised in 1 wt % to 60 wt % based on 100 wt % of the total solid content of the composition for the light conversion layer.

5. The composition for the light conversion layer of claim 1, wherein the thermal curing agent is represented by at least one of the following Formula 2 and Formula 3:

[Formula 2]

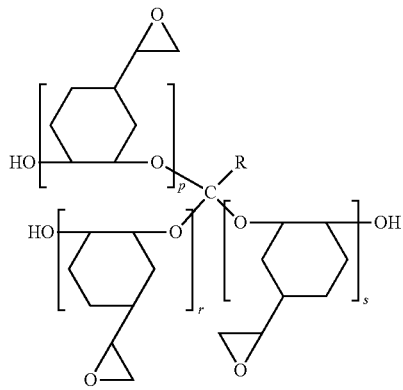

[Formula 3]

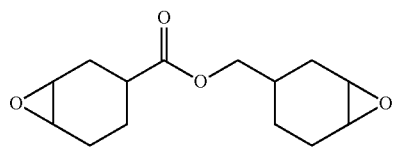

wherein, R is a substituted or unsubstituted alkyl group of 1 to 10 carbon atoms, and wherein p, r, and s are each independently an integer of 1 to 20.

6. The composition for the light conversion layer of claim 1, further comprising at least one solvent having a boiling point of about 100° C. to about 180° C.

7. The composition for the light conversion layer of claim 6, wherein
the at least one solvent is comprised in 50 wt % to 90 wt % based on a total weight of the composition for a light conversion layer,
the base resin is comprised in 20 wt % to 89 wt % based on 100 wt % of the total solid content of the composition for the light conversion layer, and
the quantum dots are comprised in 1 wt % to 60 wt % based on 100 wt % of the total solid content of the composition for the light conversion layer.

8. A light conversion layer comprising:
a matrix part;
quantum dots dispersed in the matrix part;
a thiol compound comprising at least one thiol group in a molecule;
a thermal curing agent comprising at least one of a polyfunctional alicyclic epoxy resin, a novolak epoxy resin and a silane epoxy resin; and
a scattering particle, wherein
the matrix part is formed of an unsaturated imide compound,
the quantum dots include a first quantum dot emitting light in a wavelength region of 520 nm to 550 nm and a second quantum dot emitting light in a wavelength region of 620 nm to 650 nm,
an amount of the first quantum dot is 2 to 10 times of an amount of the second quantum dot based on weight,
the thiol compound is comprised in 13 wt % to 40 wt % based on 100 wt % of a total solid content of the composition for a light conversion layer,
the thermal curing agent is comprised in 10 wt % to 40 wt % based on 100 wt % of the total solid content of the composition for the light conversion layer,
the scattering particle is comprised in 0.5 wt % to 20 wt % based on 100 wt % of the total solid content of the composition for the light conversion layer,
the total solid content of the composition for the light conversion layer comprises the matrix part, the quantum dots, the thiol compound, the thermal curing agent, and the scattering particle, and
the thiol compound comprises at least one of the following compounds TC-2, TC-3, TC-4, TC-5, and TC-6:

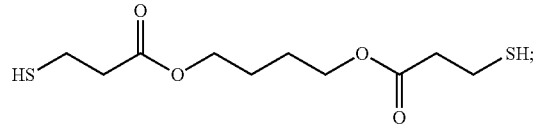

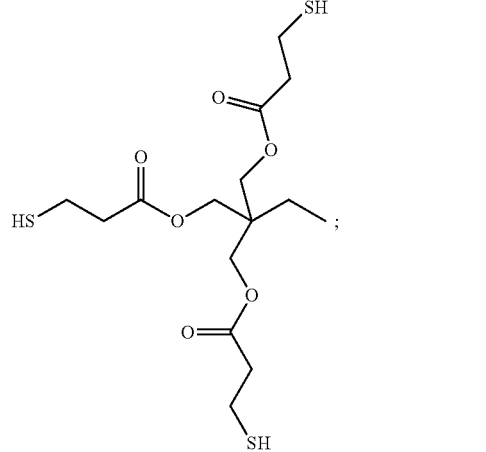

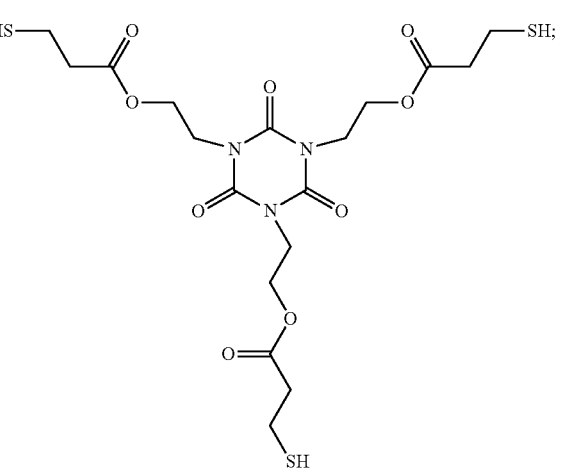

-continued

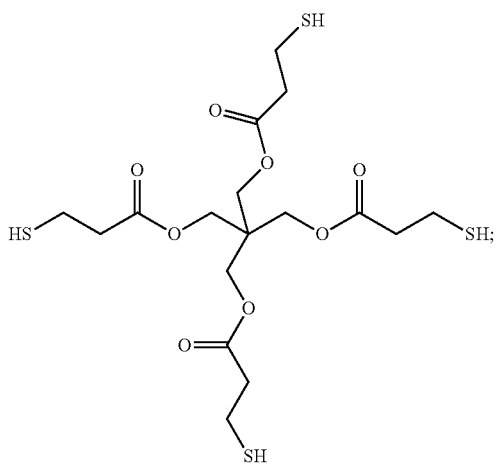

TC-5

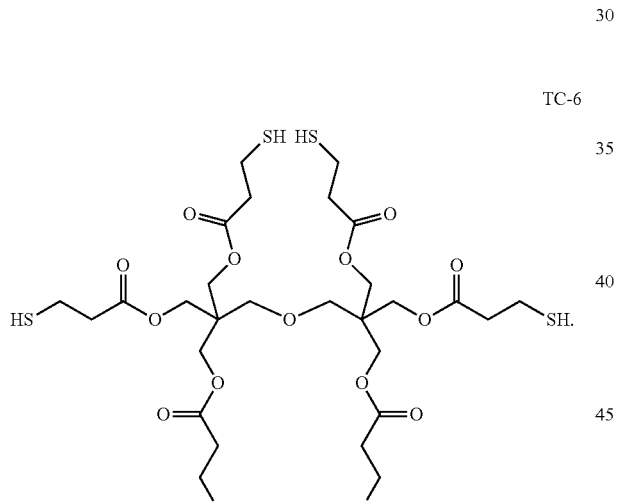

TC-6

9. An electronic device comprising:
a light source part providing first color light; and
a light conversion layer disposed on the light source part, wherein
the light conversion layer comprises:
  a matrix part;
  quantum dots configured to convert a wavelength of the first color light; and
  a thiol compound comprising at least one thiol group in a molecule;
  a thermal curing agent comprising at least one of a polyfunctional alicyclic epoxy resin, a novolak epoxy resin, and a silane epoxy resin; and
  a scattering particle,
the matrix part is formed of an unsaturated imide compound, the quantum dots include a first quantum dot emitting light in a wavelength region of 520 nm to 550 nm and a second quantum dot emitting light in a wavelength region of 620 nm to 650 nm, an amount of the first quantum dot is 2 to 10 times of an amount of the second quantum dot based on weight, the thiol compound is comprised in 13 wt % to 40 wt % based on 100 wt % of a total solid content of the composition for a light conversion layer, the thermal curing agent is comprised in 10 wt % to 40 wt % based on 100 wt % of the total solid content of the composition for the light conversion layer, and the scattering particle is comprised in 0.5 wt % to 20 wt % based on 100 wt % of the total solid content of the composition for the light conversion layer, the total solid content of the composition for the light conversion layer comprises the matrix part, the quantum dots, the thiol compound, the thermal curing agent, and the scattering particle, and the thiol compound comprises at least one of the following compounds TC-2, TC-3, TC-4, TC-5, and TC-6:

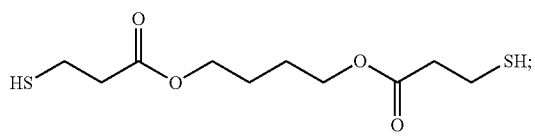

TC-2

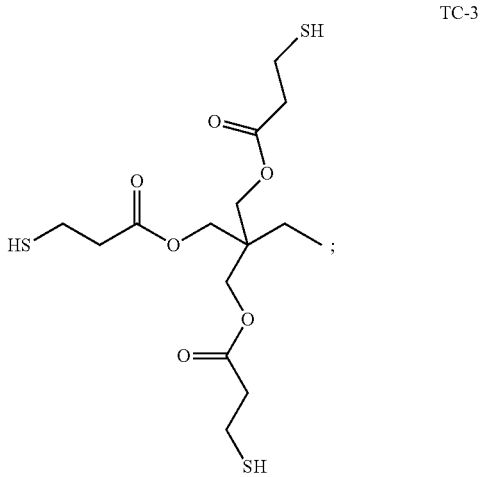

TC-3

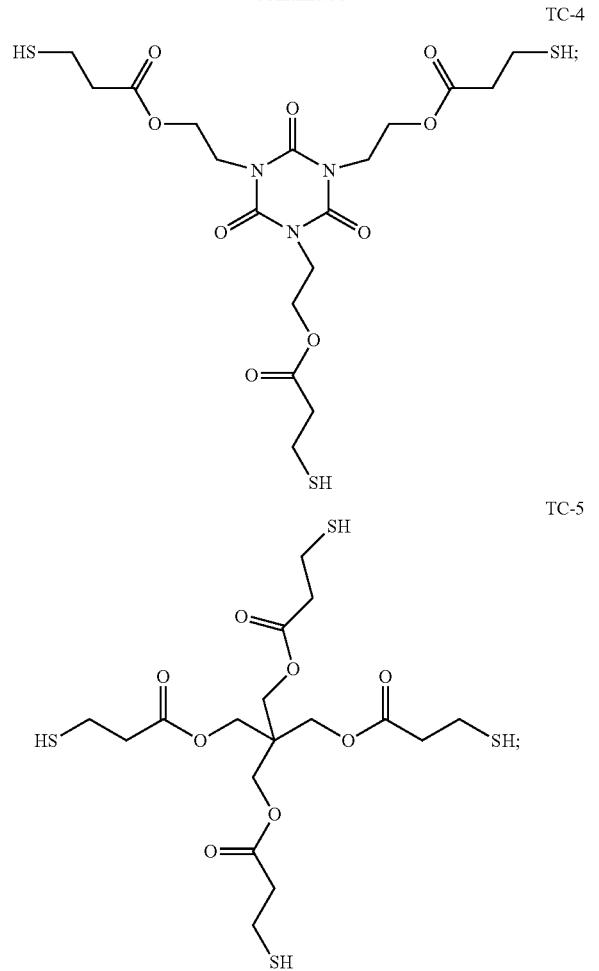
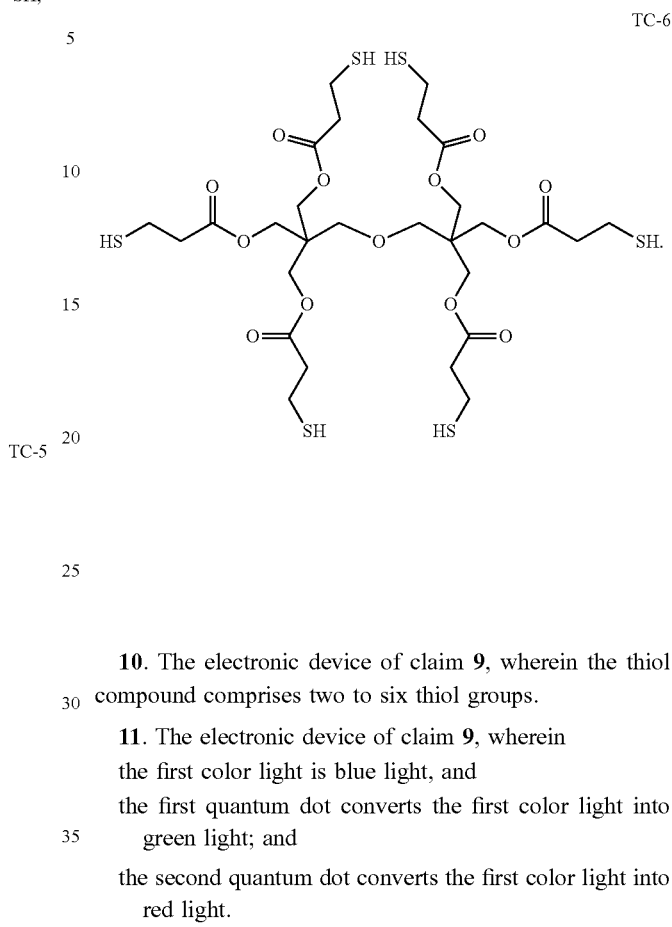
10. The electronic device of claim 9, wherein the thiol compound comprises two to six thiol groups.
11. The electronic device of claim 9, wherein
the first color light is blue light, and
the first quantum dot converts the first color light into green light; and
the second quantum dot converts the first color light into red light.
* * * * *

UNITED STATES PATENT AND TRADEMARK OFFICE
CERTIFICATE OF CORRECTION

PATENT NO. : 11,675,231 B2  
APPLICATION NO. : 16/688882  
DATED : June 13, 2023  
INVENTOR(S) : Baek Hee Lee et al.

Page 1 of 1

It is certified that error appears in the above-identified patent and that said Letters Patent is hereby corrected as shown below:

On the Title Page

Please add:  
(30) Foreign Application Priority Data  
Dec. 19, 2018 (KR) ..................... 10-2018-0164817

Signed and Sealed this
Twenty-fifth Day of July, 2023

Katherine Kelly Vidal
*Director of the United States Patent and Trademark Office*